United States Patent
Matsumura

(10) Patent No.: US 10,116,809 B2
(45) Date of Patent: Oct. 30, 2018

(54) IMAGE PROCESSING APPARATUS, CONTROL METHOD, AND COMPUTER-READABLE STORAGE MEDIUM, WHICH OBTAINS CALIBRATION IMAGE INFORMATION WITH WHICH TO CORRECT IMAGE DATA

(71) Applicant: CANON KABUSHIKI KAISHA, Tokyo (JP)

(72) Inventor: Takeshi Matsumura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 14/984,806

(22) Filed: Dec. 30, 2015

(65) Prior Publication Data
US 2016/0205272 A1    Jul. 14, 2016

(30) Foreign Application Priority Data
Jan. 8, 2015    (JP) .................. 2015-002510

(51) Int. Cl.
*H04N 1/00*   (2006.01)
*H04N 1/10*   (2006.01)
*H04N 1/195*  (2006.01)
*H04N 1/32*   (2006.01)

(52) U.S. Cl.
CPC ..... *H04N 1/00087* (2013.01); *H04N 1/00018* (2013.01); *H04N 1/00023* (2013.01); *H04N 1/00063* (2013.01); *H04N 1/00129* (2013.01); *H04N 1/00204* (2013.01); *H04N 1/00267* (2013.01); *H04N 1/00748* (2013.01); *H04N 1/00827* (2013.01); *H04N 1/1061* (2013.01); *H04N 1/19594* (2013.01); *H04N 1/32475* (2013.01); *H04N 2201/0081* (2013.01); *H04N 2201/0084* (2013.01); *H04N 2201/0089* (2013.01); *H04N 2201/0094* (2013.01); *H04N 2201/043* (2013.01);
(Continued)

(58) Field of Classification Search
CPC .......... H04N 1/00087; H04N 1/00748; H04N 2201/04787; H04N 1/00753
USPC ........................ 358/504, 505, 525, 538, 464
See application file for complete search history.

(56) References Cited

U.S. PATENT DOCUMENTS 5,214,470 A * 5/1993 Denber .............. H04N 1/4097
                                                    355/75
5,969,829 A * 10/1999 Matsuda ............ H04N 1/1013
                                                    355/25
(Continued)

FOREIGN PATENT DOCUMENTS

JP    2002-209147 A    7/2002
JP    2004-282686 A    10/2004
(Continued)

*Primary Examiner* — Jamares Q Washington
(74) *Attorney, Agent, or Firm* — Canon USA, Inc. I.P. Division

(57) ABSTRACT

An image processing apparatus obtains image data by photographing a document which is put on a document plate. The apparatus includes an obtaining unit and a correction unit. The obtaining unit photographs the document plate and obtains calibration image data. The correction unit uses the calibration image data obtained by the obtaining unit, so as to correct the image data obtained by photographing the document which is put on the document plate.

5 Claims, 20 Drawing Sheets

(52) U.S. Cl.
CPC ............... *H04N 2201/0426* (2013.01); *H04N 2201/0436* (2013.01); *H04N 2201/0458* (2013.01)

(56) References Cited

U.S. PATENT DOCUMENTS

| | | | |
|---|---|---|---|
| 2007/0153106 A1* | 7/2007 | Subbotin | G06T 3/4015 348/272 |
| 2013/0021654 A1* | 1/2013 | Ogawa | H04N 1/00381 358/474 |
| 2014/0010442 A1* | 1/2014 | Kato | G06K 9/6202 382/164 |

FOREIGN PATENT DOCUMENTS

| | | |
|---|---|---|
| JP | 2007-110179 A | 4/2007 |
| JP | 2011-081294 A | 4/2011 |

* cited by examiner

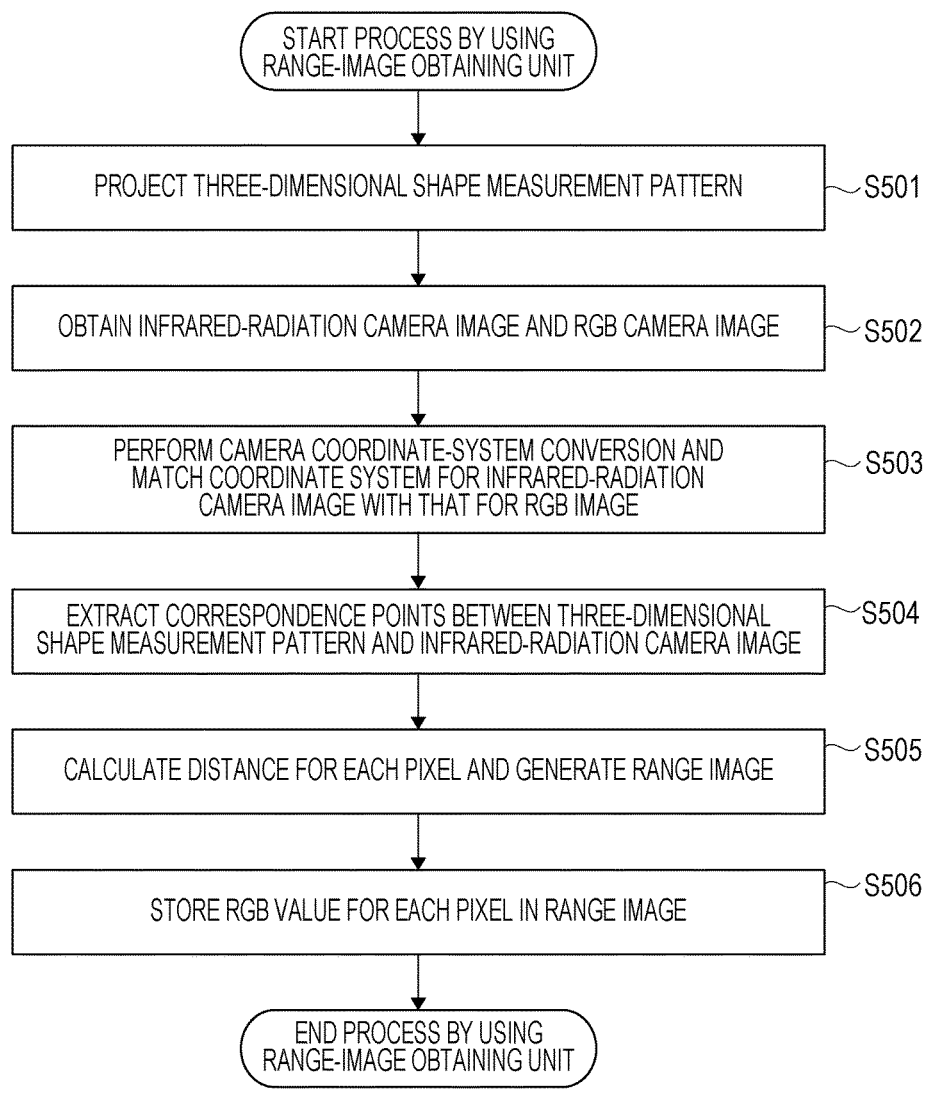

IMAGE PROCESSING APPARATUS, CONTROL METHOD, AND COMPUTER-READABLE STORAGE MEDIUM, WHICH OBTAINS CALIBRATION IMAGE INFORMATION WITH WHICH TO CORRECT IMAGE DATA

BACKGROUND OF THE INVENTION

Field of the Invention

The present invention relates to an image processing apparatus, an information processing method, and a non-transitory computer-readable medium.

Description of the Related Art

Heretofore, apparatuses which scan documents and which store the resulting data as electronic data are line scanners using line sensors to capture images, and camera scanners using two-dimensional imaging sensors to capture images. In particular, in the case of a camera scanner in which a camera is disposed above a document board and which captures an image of a document which is put on the document board and whose surface faces upward, unlike a line scanner, no closed space is present between the camera and the document board. Therefore, the install position of the camera scanner may cause an adverse effect produced by incident light from the outside or illumination light.

Therefore, to improve the image quality of image data obtained from a photographed document, a camera scanner needs to perform calibration in accordance with the installation environment, and needs to correct the photographed document data by using obtained correction parameters.

Attachment or the like of dust or dirt occurs as the document board is used. When a document is put on the document board, an adhered substance, such as dust or dirt, does not affect the photographed document data because the adhered substance is hidden under the document. In contrast, an adverse effect produced by incident light from the outside or illumination light does not change even when a document is put. Therefore, in a calibration process in which the document board is photographed to obtain correction parameters, the camera scanner needs to differentiate an adverse effect produced by an adhered substance, such as dust or dirt, from that produced by incident light from the outside or illumination light, and the adverse effect produced by an adhered substance, such as dust or dirt, needs to be removed. An image scanning apparatus disclosed in Japanese Patent Laid-Open No. 2007-110179 identifies whether occurrence of uneven image density is caused by dust attached to a light path or by uneven sensitivity of image sensors, and performs an adequate process.

However, the image scanning apparatus disclosed in Japanese Patent Laid-Open No. 2007-110179 employs a method of identifying an adverse effect produced by dust attached to a light path, by specifying black in an image. Therefore, a problem arises in which the image scanning apparatus has difficulty in making correct identification when the color of an adhered substance in the image is other than black.

SUMMARY OF THE INVENTION

The present invention provides a technique of specifying an adhered substance regardless of the color of the adhered substance.

The present invention provides an image processing apparatus obtaining image data by photographing a document which is put on a document plate. The apparatus includes an obtaining unit and a correction unit. The obtaining unit photographs the document plate and obtains calibration image data. The correction unit uses the calibration image data obtained by the obtaining unit, so as to correct the image data obtained by photographing the document which is put on the document plate.

The present invention enables an adhered substance to be specified regardless of the color of the adhered substance.

Further features of the present invention will become apparent from the following description of exemplary embodiments with reference to the attached drawings.

BRIEF DESCRIPTION OF THE DRAWINGS

FIGS. 5A to 5D are a flowchart and explanatory diagrams illustrating an exemplary process performed by a range-image obtaining unit.

DESCRIPTION OF THE EMBODIMENTS

Embodiments of the present invention will be described below on the basis of the drawings.

First Embodiment

System Configuration of Camera Scanner System

Figure 1:
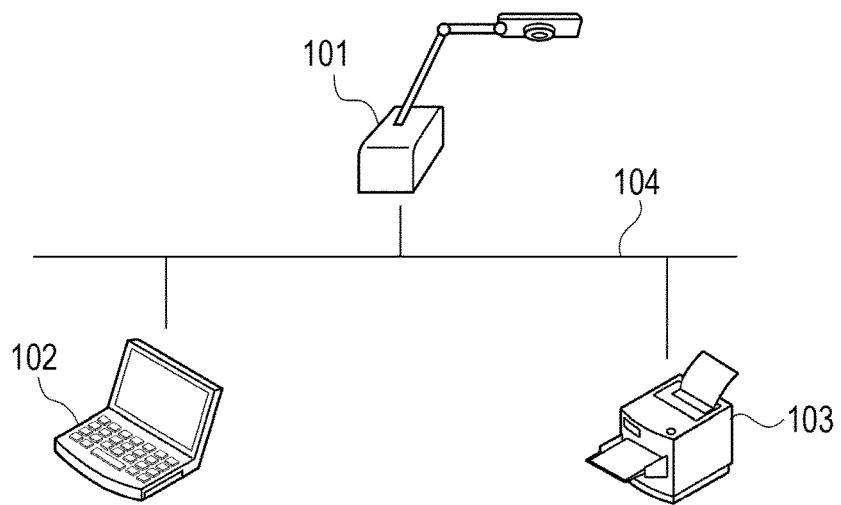
FIG. 1 is a diagram illustrating an exemplary system configuration of a camera scanner system.

FIG. 1 illustrates an exemplary system configuration of a camera scanner system including a camera scanner 101 according to a first embodiment.

The camera scanner 101 is connected to a host computer 102, a printer 103, and the like via a network 104 such as a local area network. The camera scanner 101 is capable of performing, for example, a scan function of reading an image, and a print function of outputting scan data via the printer 103, on the basis of an instruction from an image processing apparatus such as the host computer 102. In addition, the camera scanner 101 is also capable of performing the scan function, the print function, and the like on the basis of a user operation performed via a user interface or the like, not via the host computer 102.

Overview of Camera Scanner

Figure 2A:
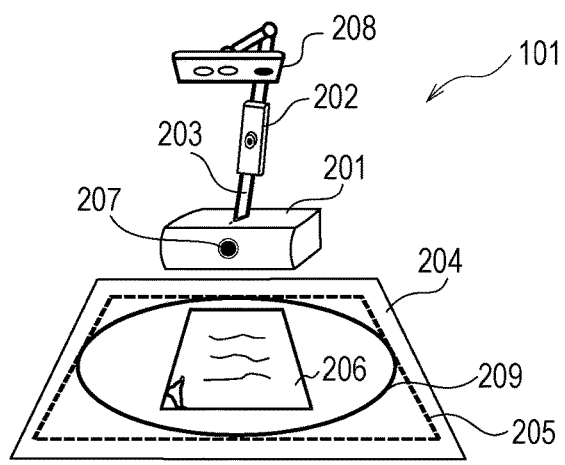
FIGS. 2A to 2C are diagrams illustrating an exemplary appearance and the like of a camera scanner.
Figure 2B:
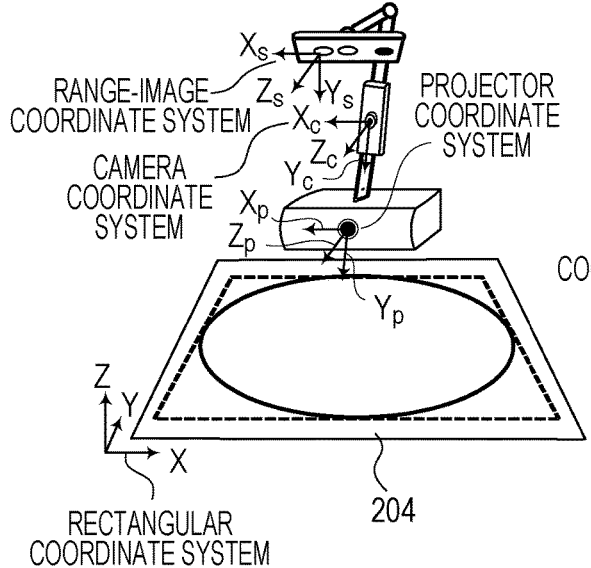
Figure 2C:
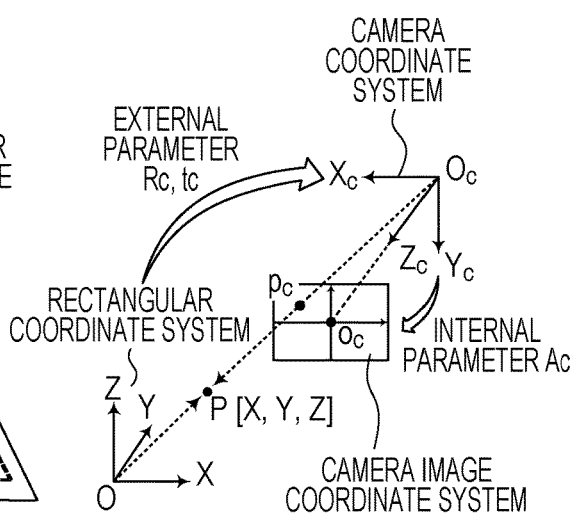

FIGS. 2A to 2C are diagrams illustrating an exemplary appearance and the like of the camera scanner.

FIG. 2A is a diagram illustrating an exemplary appearance of the camera scanner 101. The camera scanner 101 includes a controller 201, a camera unit 202, an arm unit 203, a projector 207, and a range-image sensor unit 208. The controller 201 which is the main body of the camera scanner 101, the camera unit 202, the projector 207, and the range-image sensor unit 208 which are used to capture an image are coupled to one another via the arm unit 203. The arm unit 203 which has joints, a mechanism for extension, a fixing mechanism, and the like is capable of being bent, extended, and fixed.

FIG. 2A also illustrates a document board 204 for which the camera scanner 101 is provided. The lenses of the camera unit 202 and the range-image sensor unit 208 are directed to the document board 204, and an image in a reading-out region 205 surrounded by using a dashed line may be captured. In the example in FIG. 2A, a document 206 is put inside the reading-out region 205. Therefore, the camera scanner 101 may read the document 206.

The camera unit 202 is capable of capturing an image with a single resolution, or may also switch between high-resolution image capture and low-resolution image capture.

As described below by using FIG. 3, the camera scanner 101 further includes a liquid crystal display (LCD) touch panel 330 and a speaker 340.

FIG. 2B is a diagram illustrating coordinate systems used in the camera scanner 101. The camera scanner 101 defines a camera coordinate system for the camera unit 202, a range-image coordinate system for the range-image sensor unit 208, and a projector coordinate system for the projector 207.

The camera coordinate system is a system in which the image plane on which the camera unit 202 captures an image is defined as the XY plane and in which the direction orthogonal to the image plane is defined as the Z direction. The range-image coordinate system is a system in which the image plane on which a red-green-blue (RGB) camera 363 of a range-image sensor unit 208 described below by using FIG. 3 captures an image is defined as the XY plane and in which the direction orthogonal to the image plane is defined as the Z direction. The projector coordinate system is a system in which the image plane on which the projector 207 performs projection is defined as the XY plane and in which the direction orthogonal to the image plane is defined as the Z direction.

To handle three-dimensional data uniformly in the camera coordinate system, the range-image coordinate system, and the projector coordinate system which are independent from each other, a rectangular coordinate system in which a plane including the document board 204 is defined as the XY plane and in which the vertical direction which extends upwardly from the XY plane is defined as the Z axis is defined.

FIG. 2C is a diagram for describing conversion of coordinate systems. FIG. 2C illustrates the relationship among the rectangular coordinate system, a space expressed by using the camera coordinate system whose center is at the camera unit 202, and the image plane on which the camera unit 202 captures an image. A three-dimensional point P[X, Y, Z] in the rectangular coordinate system is converted into a three-dimensional point $P_c[X_c, Y_c, Z_c]$ in the camera coordinate system by using Expression (1) described below.

$$[X_c,Y_c,Z_c]^T=[R_c|t_c][X,Y,Z,1]^T \quad \text{Expression (1)}$$

$R_c$ and $t_c$ in Expression (1) are external parameters obtained by using the orientation (rotation) and the position (translation) of the camera, respectively, relative to the rectangular coordinate system. $R_c$ is a 3×3 rotation matrix, and $t_c$ is a translation vector.

In contrast, a three-dimensional point defined in the camera coordinate system is converted into a point in the rectangular coordinate system by using Expression (2) described below.

$$[X,Y,Z]^T=[R_c^{-1}|-R_c^{-1}t_c][X_c,Y_c,Z_c,1]^T \quad \text{Expression (2)}$$

The two-dimensional camera image plane photographed by the camera unit 202 is a plane obtained by the camera unit 202 converting three-dimensional information in a three-dimensional space into two-dimensional information. That is, the three-dimensional point $P_c[X_c, Y_c, Z_c]$ in the camera coordinate system is subjected to perspective projection conversion, and is converted into a two-dimensional coordinates $p_c[x_p, y_p]$ on the camera image plane by using Expression (3) described below.

$$\lambda[x_p,y_p,1]^T=A[X_c,Y_c,Z_c]^T \quad \text{Expression (3)}$$

The symbol A in Expression (3) is called an internal parameter of a camera, and is a 3×3 matrix expressed on the basis of the focal length, the image center, and the like.

As described above, by using Expression (1) and Expression (3), the camera scanner 101 is capable of converting a three-dimensional point group expressed in the rectangular coordinate system into three-dimensional point group coordinates in the camera coordinate system or coordinates on the camera image plane. The internal parameters of the camera unit 202, the range-image sensor unit 208, and the projector 207, and the position and orientation (external parameters) relative to the rectangular coordinate system are calibrated in advance by using a known calibration method. In the description below, if not otherwise specified, a three-dimensional point group denotes three-dimensional data in the rectangular coordinate system.

Hardware Configuration of Controller of Camera Scanner

Figure 3:
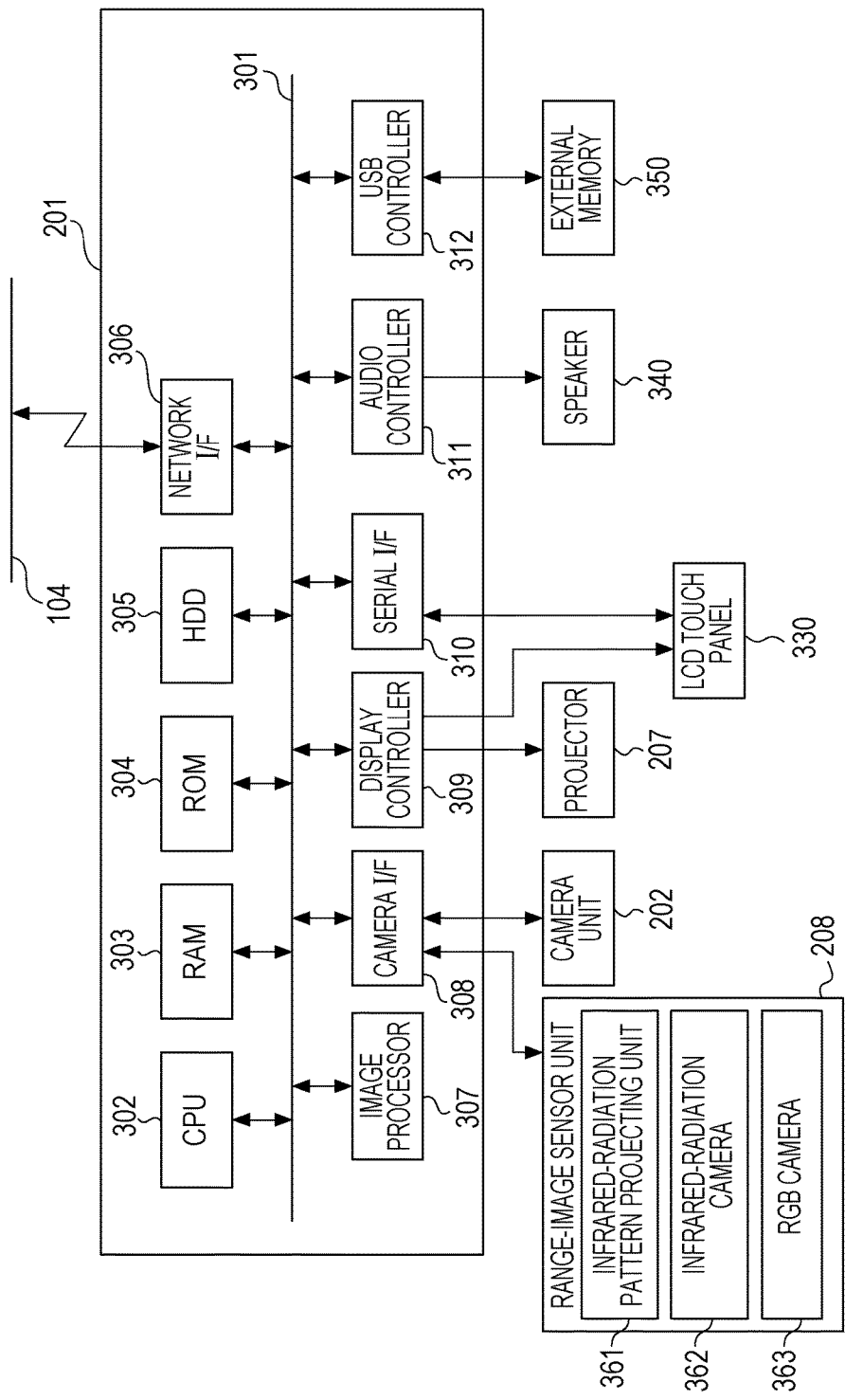
FIG. 3 is a diagram illustrating an exemplary hardware configuration of a controller.

FIG. 3 is a diagram illustrating an exemplary hardware configuration of the controller 201. The controller 201 is the main body of the camera scanner 101.

The controller 201 includes a central processing unit (CPU) 302, a random-access memory (RAM) 303, a read-only memory (ROM) 304, a hard disk drive (HDD) 305, a network interface (I/F) 306, an image processor 307, a camera I/F 308, and a display controller 309. The controller 201 also includes a serial I/F 310, an audio controller 311, and a Universal Serial Bus (USB) controller 312. The hardware configuration components 302 to 312 of the controller 201 are connected to one another via a system bus 301.

The CPU 302 is a central processing unit which controls the operations of the entire controller 201. The RAM 303 is a volatile memory. The ROM 304 which is a nonvolatile memory stores boot programs and the like for the CPU 302. The HDD 305 is a hard disk drive (HDD) or the like having a large capacity compared with the RAM 303. The HDD 305 stores control programs or the like of the camera scanner 101 which are performed by the controller 201.

When the camera scanner 101 is activated, for example, when the power supply is turned on, the CPU 302 loads the boot programs stored in the ROM 304, on the RAM 303, and executes the boot programs. The boot programs are programs for executing a process of reading the control programs stored in the HDD 305 or the like and loading the control programs on the RAM 303.

When the CPU 302 executes the boot programs, the CPU 302 subsequently executes the control programs of the camera scanner 101 which are loaded on the RAM 303, and controls the camera scanner 101. In addition, the CPU 302 reads data used for operations performed by using the control programs, from the HDD 305 or the like, stores the data on the RAM 303, and reads and writes the data. The HDD 305 stores various settings necessary for the operations using the control programs, and also stores image data generated from camera input. The CPU 302 reads and writes the various settings and the image data stored in the HDD 305. The CPU 302 communicates with other apparatuses on the network 104 via the network I/F 306.

The image processor 307 reads image data stored in the RAM 303, performs image processing on the data, and writes the data back to the RAM 303. The image processing performed by the image processor 307 includes processes, such as rotation, magnification, and color conversion.

The CPU 302 which is connected to the camera unit 202 and the range-image sensor unit 208 via the camera I/F 308 obtains image data from the camera unit 202, obtains range image data from the range-image sensor unit 208, and writes the data in the RAM 303. In addition, the CPU 302 transmits a control command to the camera unit 202 and the range-image sensor unit 208 via the camera I/F 308 so as to perform setting of the camera unit 202 and the range-image sensor unit 208.

The CPU 302 controls display of image data on a display such as the LCD touch panel 330 via the display controller 309. The CPU 302 controls image data which is output by the projector 207, via the display controller 309. The display controller 309 is connected to the projector 207 and the LCD touch panel 330.

The CPU 302 performs input and output of a serial signal via the serial I/F 310. The serial I/F 310 is connected to the LCD touch panel 330. When the LCD touch panel 330 is pressed, the CPU 302 obtains the coordinates at which pressing is performed, via the serial I/F 310.

The audio controller 311 is connected to the speaker 340. The CPU 302 converts voice data into an analog voice signal via the audio controller 311, and outputs voice through the speaker 340.

The CPU 302 controls an external USB device via the USB controller 312. The USB controller 312 is connected to an external memory 350, such as a USB memory and a secure digital (SD) card. The CPU 302 reads and writes data from/to the external memory 350 via the USB controller 312.

The CPU 302 performs a process on the basis of programs stored in the RAM 303 or the HDD 305, whereby the functions of the camera scanner 101 which are described below and the processes in the flowcharts described below are achieved.

Various thresholds used in the processes described below are stored in the HDD 305 and the like. The CPU 302 is capable of changing the threshold values stored in the HDD 305 and the like on the basis of a user operation through the LCD touch panel 330 or the like.

Functional Configuration of Camera Scanner

Figure 4A:
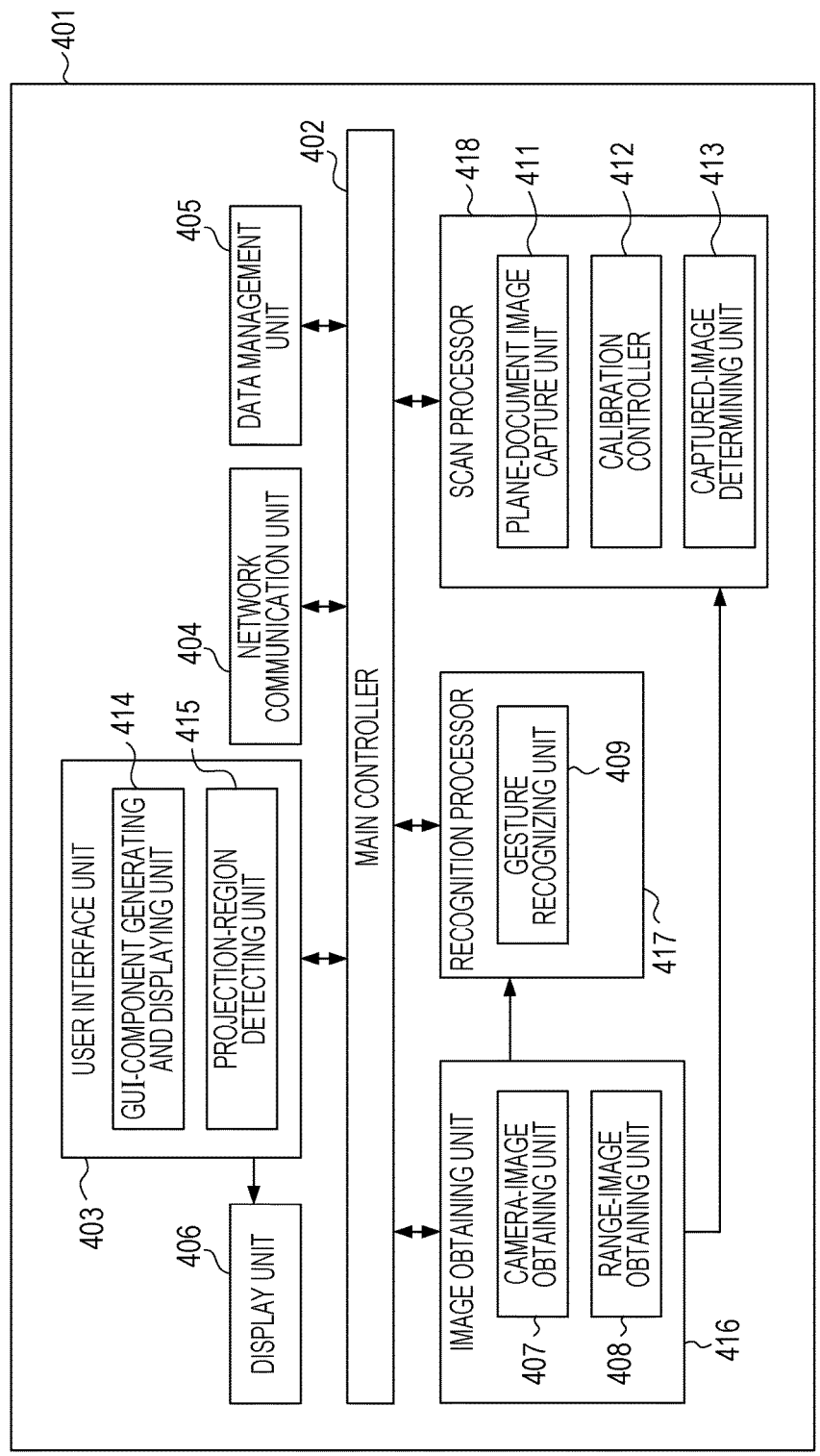
FIGS. 4A and 4B are diagrams illustrating an exemplary functional configuration and the like of the camera scanner.
Figure 4B:
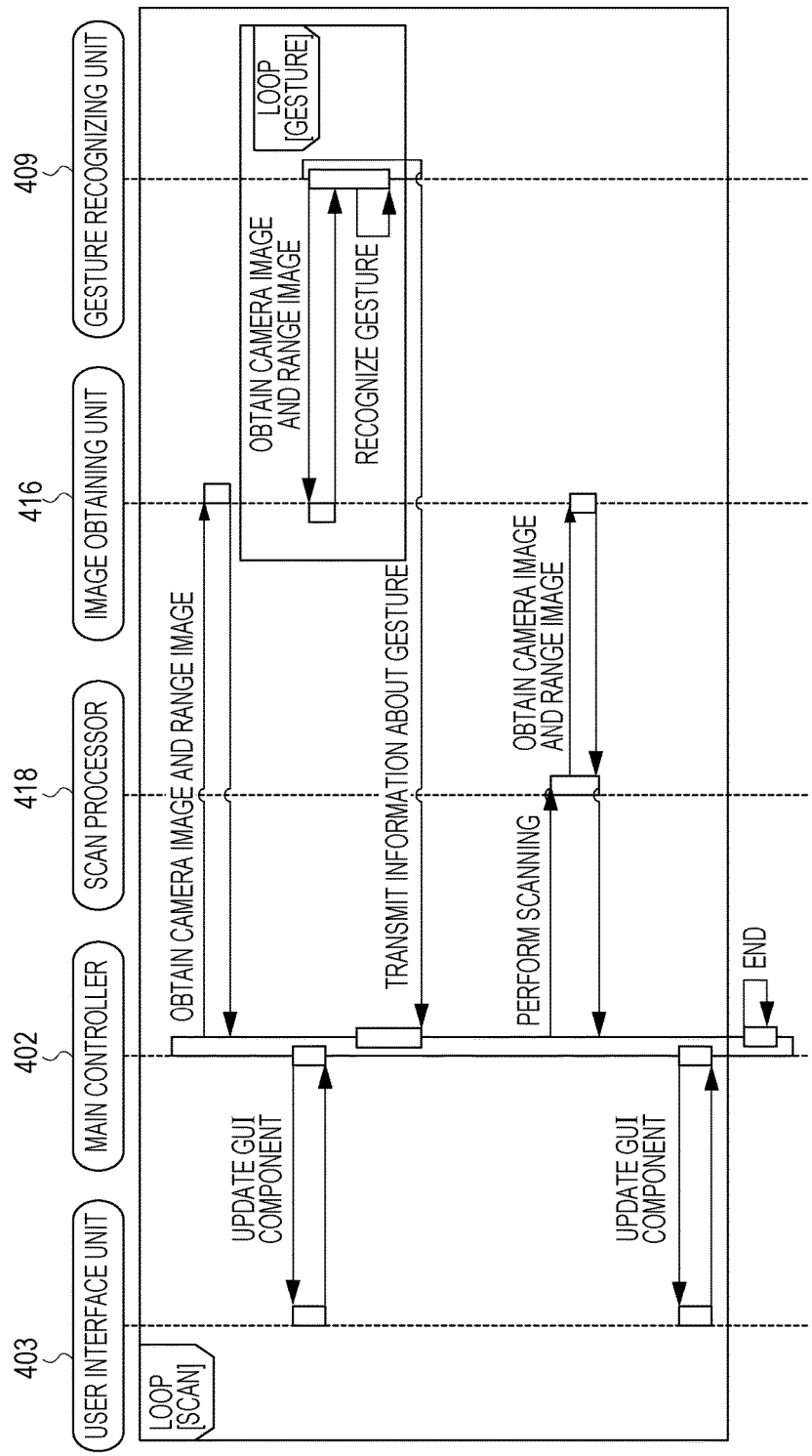

FIGS. 4A and 4B are diagrams illustrating an exemplary functional configuration and the like of the camera scanner 101. FIG. 4A is a diagram illustrating a functional configuration 401 of the camera scanner 101 which is performed by the CPU 302. FIG. 4B illustrates the relationship among modules of the camera scanner 101 as a sequence chart.

The control programs of the camera scanner 101 which are stored in the HDD 305 are loaded on the RAM 303 by the CPU 302 upon startup, and are executed.

A main controller 402 which serves as the center of control controls the other modules of the camera scanner 101 as illustrated in the sequence chart in FIG. 4B.

An image obtaining unit 416 which is a module performing an image input process includes a camera-image obtaining unit 407 and a range-image obtaining unit 408. The camera-image obtaining unit 407 obtains image data which is output by the camera unit 202, via the camera I/F 308, and stores the data in the RAM 303. The range-image obtaining unit 408 obtains range image data which is output by the range-image sensor unit 208, via the camera I/F 308, and stores the data in the RAM 303. The detail of the process performed by the range-image obtaining unit 408 will be described below by using FIGS. 5A to 5D.

A recognition processor 417 which is a module detecting and recognizing a motion of an object above the document board 204 from image data obtained from the camera-image obtaining unit 407, the range-image obtaining unit 408, and the like includes a gesture recognizing unit 409. The gesture recognizing unit 409 continues to obtain an image on the document board 204 from the image obtaining unit 416. When the gesture recognizing unit 409 detects a gesture such as touching, the gesture recognizing unit 409 notifies the main controller 402 of the detection. The detail of the process performed by the gesture recognizing unit 409 will be described below by using FIGS. 6, and 7A to 7C.

A scan processor 418 which is a module which actually scans a target includes a plane-document image capture unit 411, a calibration controller 412, and a captured-image determining unit 413. The plane-document image capture unit 411 performs a process suitable for a plane document on the basis of information from the calibration controller 412, and outputs data in a format according to the process. The calibration controller 412 controls timing at which the plane-document image capture unit 411 performs a calibration process for image correction, and notifies the plane-document image capture unit 411 of the timing. The detail of the processes performed by the modules of the plane-document image capture unit 411 and the calibration controller 412 will be described below by using FIGS. 8A, 8B, 9A to 9E, and 10A to 10I.

A user interface unit 403 includes a graphical user interface (GUI)-component generating and displaying unit 414, and a projection-region detecting unit 415. The GUI-component generating and displaying unit 414 receives a request from the main controller 402, and generates GUI components, such as messages and buttons. The GUI-component generating and displaying unit 414 requests a display unit 406 to display the generated GUI components. The projection-region detecting unit 415 detects locations at which the GUI components are to be displayed on the document board 204.

The display unit 406 performs display of the GUI components which is requested by the GUI-component generating and displaying unit 414, on the projector 207 or the LCD touch panel 330 via the display controller 309. Since the projector 207 is directed toward the document board 204, the projector 207 projects the GUI components on the document board 204. The user interface unit 403 receives a gesture operation such as touching which is recognized by the gesture recognizing unit 409, or receives an input operation from the LCD touch panel 330 via the serial I/F 310. The user interface unit 403 also receives the coordinates of the gesture operation or the input operation, and the like. The user interface unit 403 determines the operation (such as a pressed button) by associating the operation screen which has been drawn with the operation coordinates.

The user interface unit 403 notifies the main controller 402 of the operation. Thus, the user interface unit 403 receives an operation performed by an operator.

A network communication unit 404 communicates with other apparatuses on the network 104 through TCP/IP via the network I/F 306.

A data management unit 405 stores various types of data such as work data generated in execution of the modules of the camera scanner 101, in an area which is set on the HDD 305, and manages the data. For example, the data management unit 405 stores scan data or the like which is generated by the plane-document image capture unit 411, in an area which is set on the HDD 305, and manages the data.

Description of Range-Image Sensor and Range-Image Obtaining Unit

FIG. 3 illustrates the configuration of the range-image sensor unit 208. The range-image sensor unit 208 is a range-image sensor employing a pattern projection method using infrared radiation. An infrared-radiation pattern projecting unit 361 projects a three-dimensional measurement pattern on a target by using infrared radiation which is invisible to eyes of human beings. An infrared-radiation camera 362 is a camera which reads the three-dimensional measurement pattern projected on the target. The RGB camera 363 is a camera which photographs light visible to eyes of human beings by using an RGB signal.

Figure 5B:
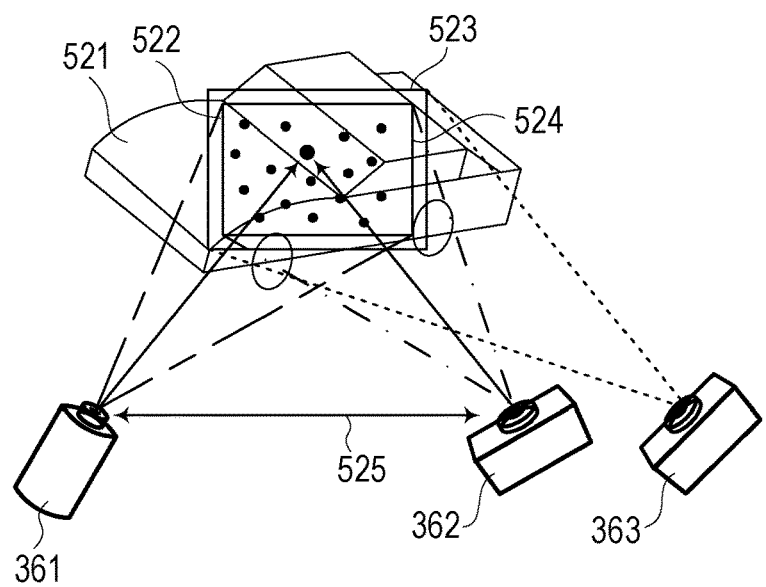
Figure 5C:
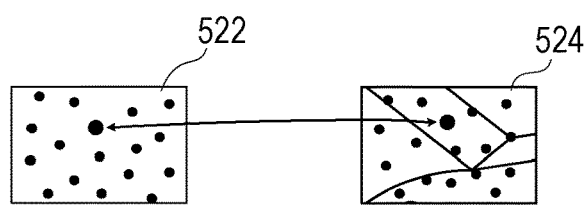
Figure 5D:
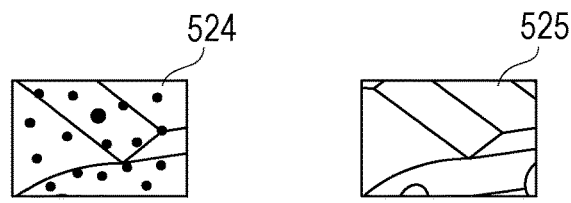

FIGS. 5A to 5D are a flowchart and diagrams which illustrate an exemplary process performed by the range-image obtaining unit. A process performed by the range-image obtaining unit 408 will be described by using the flowchart in FIG. 5A. FIGS. 5B to 5D are diagrams for describing the principle of measurement for a range image using a pattern projection method. When the range-image obtaining unit 408 starts the process, the process in FIG. 5A is started.

In S501, as illustrated in FIG. 5B, the range-image obtaining unit 408 projects a three-dimensional shape measurement pattern 522 on a target 521 by using infrared radiation via the infrared-radiation pattern projecting unit 361.

In S502, the range-image obtaining unit 408 obtains an RGB camera image 523 obtained by photographing the target, via the RGB camera 363, and obtains an infrared-radiation camera image 524 obtained by photographing the three-dimensional shape measurement pattern 522 projected in S501, via the infrared-radiation camera 362. The infrared-radiation camera 362 and the RGB camera 363 are disposed at different positions. Therefore, as illustrated in FIG. 5B, the photographed region of the RGB camera image 523 and that of the infrared-radiation camera image 524 which are obtained by capturing images with the infrared-radiation camera 362 and the RGB camera 363, respectively, are different from each other.

In S503, the range-image obtaining unit 408 performs coordinate-system conversion from the coordinate system for the infrared-radiation camera 362 to that for the RGB camera 363, on the infrared-radiation camera image 524, and matches the coordinate systems for the infrared-radiation camera image 524 and the RGB camera image 523. The relative position between the infrared-radiation camera 362 and the RGB camera 363, and the internal parameter between the infrared-radiation camera 362 and the RGB camera 363 are known through a calibration process performed in advance.

In S504, as illustrated in FIG. 5C, the range-image obtaining unit 408 extracts correspondence points between the three-dimensional shape measurement pattern 522 and the infrared-radiation camera image 524 obtained by performing coordinate conversion in S503. For example, the range-image obtaining unit 408 searches the three-dimensional shape measurement pattern 522 for one point on the infrared-radiation camera image 524. When the same point is detected, the range-image obtaining unit 408 associates the points with each other. Alternatively, the range-image obtaining unit 408 may search the three-dimensional shape measurement pattern 522 for a pattern surrounding a pixel of the infrared-radiation camera image 524, and may associate a portion whose similarity is the highest with the pixel.

In S505, the range-image obtaining unit 408 calculates the distance from the infrared-radiation camera 362 by performing the calculation using the principle of triangulation by using a straight line connecting the infrared-radiation pattern projecting unit 361 to the infrared-radiation camera 362 as a base line 525. For a pixel for which association is made in S504, the distance from the infrared-radiation camera 362 is calculated and stored as a pixel value. A pixel for which no association is made is regarded as a portion for which the distance fails to be measured, and an invalid value is stored. The range-image obtaining unit 408 performs the above-described process on all of the pixels in the infrared-radiation camera image 524 obtained through the coordinate conversion in S503, thereby generating a range image having distance values for the pixels.

In S506, the range-image obtaining unit 408 obtains an RGB value corresponding to each of the pixels in the range image on the basis of the RGB camera image 523 whose coordinate system is matched, in S503, with the coordinate system of the image generated in S505. The range-image obtaining unit 408 stores a corresponding RGB value for each of the pixels in the range image, thereby generating a range image in which four values of R, G, B, and the distance are stored for one pixel. The generated range image is based on the coordinate system of the RGB camera 363 of the range-image sensor unit 208. Therefore, as described above by using FIG. 2B, the range-image obtaining unit 408 converts the range image obtained by using the coordinate system of the RGB camera 363 into a three-dimensional point group in the rectangular coordinate system. In the description below, unless otherwise specified, a three-dimensional point group denotes a three-dimensional point group in the rectangular coordinate system.

In the first embodiment, the range-image sensor unit 208 employs an infrared radiation pattern projection method as a method for obtaining range information. Alternatively, a range-image sensor using another method may be used. For example, the range-image sensor unit 208 may use a stereoscopic method for making stereoscopic vision by using two RGB cameras, or a method of time of flight (TOF) which measures a distance by detecting the duration of flight of laser light.

Description of Gesture Recognizing Unit

Figure 6:
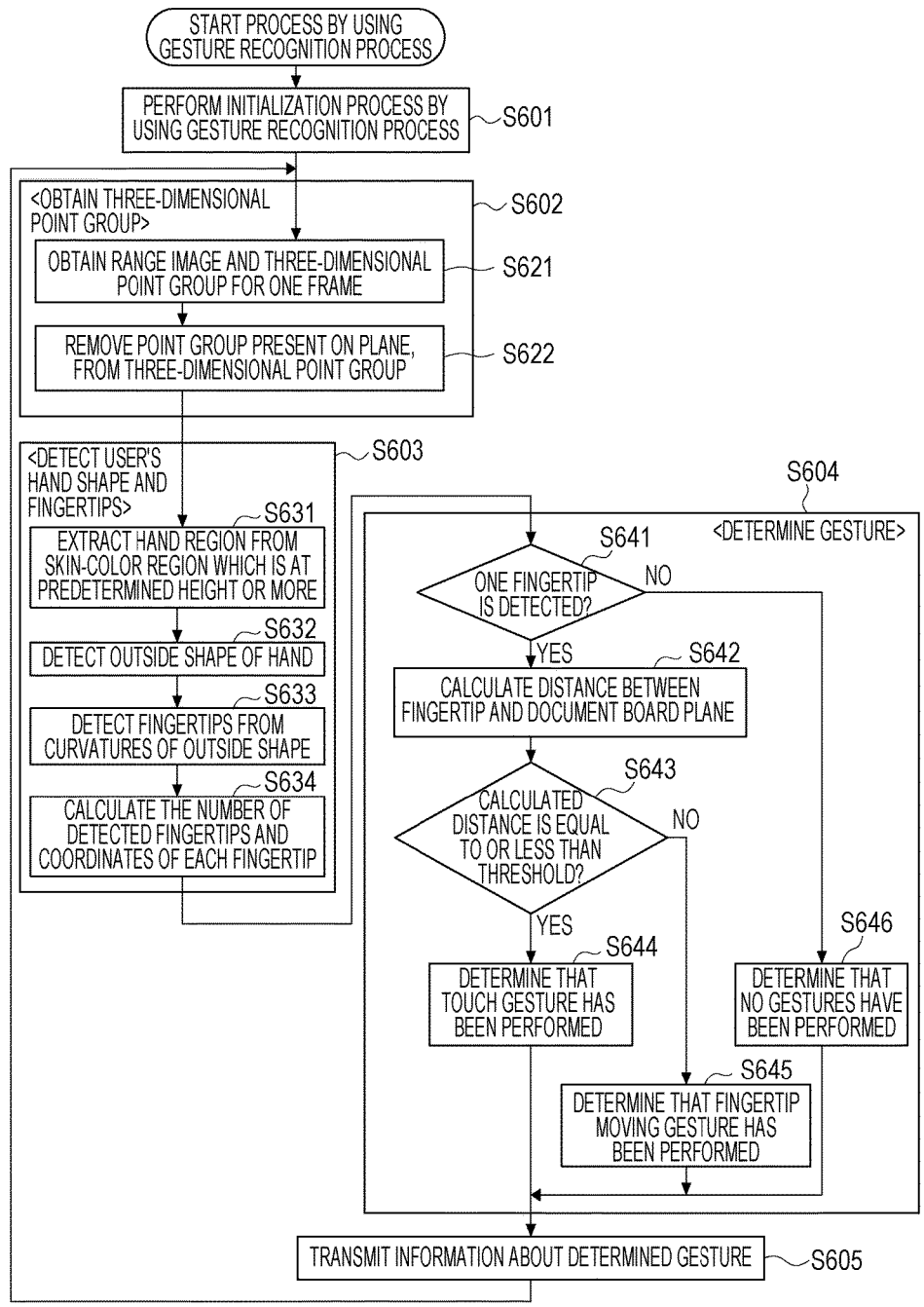
FIG. 6 is a flowchart of an exemplary process performed by a gesture recognizing unit.

FIG. 6 is a flowchart of an exemplary process performed by the gesture recognizing unit 409. A gesture recognition process performed by the gesture recognizing unit 409 will be described by using FIG. 6.

In S601, the gesture recognizing unit 409 performs an initialization process. The gesture recognizing unit 409 obtains the range image for one frame from the range-image obtaining unit 408. When the process in FIG. 6 is started, no targets are put on the document board 204. Therefore, the gesture recognizing unit 409 recognizes the plane including the document board 204 as the initial state. That is, the gesture recognizing unit 409 extracts the broadest plane from the obtained range image, calculates the position and the normal vector (hereinafter referred to as plane parameters of the document board 204), and stores the calculated data in the RAM 303.

In S602, the gesture recognizing unit 409 obtains a three-dimensional point group of an object which is present on the document board 204. The process in S602 includes the processes of S621 to S622.

In S621, the gesture recognizing unit 409 obtains the range image and its three-dimensional point group for one frame from the range-image obtaining unit 408.

In S622, the gesture recognizing unit 409 removes a point group which is present on the plane including the document board 204, from the three-dimensional point group obtained in S621 on the basis of the plane parameters of the document board 204.

Figure 7A:
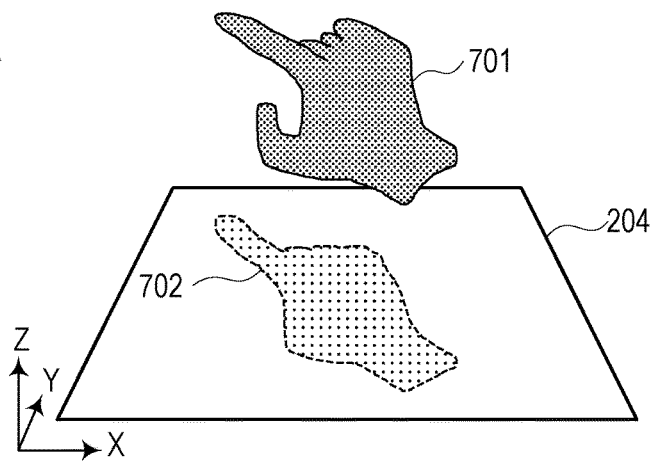
FIGS. 7A to 7C are explanatory diagrams illustrating a process performed by the gesture recognizing unit.
Figure 7B:
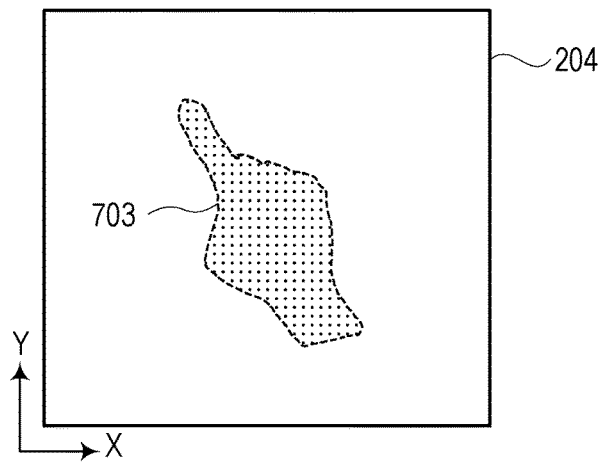
Figure 7C:
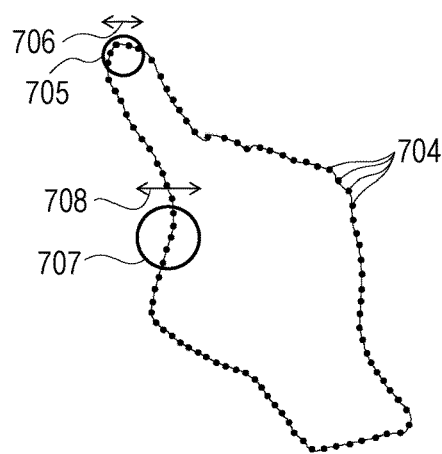

In S603, the gesture recognizing unit 409 detects a user's hand shape and his/her fingertips from the three-dimensional point group obtained in S602. The process in S603 includes the processes of S631 to S634. The process in S603 will be described by using FIGS. 7A to 7C. FIGS. 7A to 7C are diagrams for describing a process performed by the gesture recognizing unit 409.

In S631, the gesture recognizing unit 409 extracts a three-dimensional point group of skin color which is at a height that is equal to or larger than a threshold which is set and that is one from the plane including the document board 204, from the three-dimensional point group obtained in S602, thereby obtaining a three-dimensional point group for a hand. A three-dimensional point group 701 in FIG. 7A represents a three-dimensional point group for a hand which is extracted in S631.

In S632, the gesture recognizing unit 409 generates a two-dimensional image obtained by projecting the three-dimensional point group for a hand which is extracted in S631, on the plane including the document board 204, and detects the outside shape of the hand. A three-dimensional point group 702 in FIG. 7A represents a three-dimensional point group obtained by projecting the three-dimensional point group 701 on the plane including the document board 204. The gesture recognizing unit 409 projects the three-dimensional point group 701 on the basis of the plane parameters of the document board 204.

As illustrated in FIG. 7B, the gesture recognizing unit 409 may extract only values of x and y coordinates from the three-dimensional point group 702, thereby handling the three-dimensional point group 702 as a two-dimensional image 703 obtained when viewed in the z axis direction. The gesture recognizing unit 409 stores information in which each point in the three-dimensional point group 701 is associated with corresponding coordinates in the two-dimensional image 703, in the RAM 303, the HDD 305, the external memory 350, or the like.

In S633, for each point on the outside shape of the hand which is detected in S632, the gesture recognizing unit 409 calculates a curvature of the outside shape at the point, and detects a point for which the calculated curvature is smaller than a threshold which is set, as a fingertip.

FIG. 7C is a schematic diagram illustrating a method for detecting a fingertip from curvatures of the outside shape of the two-dimensional image 703. A point group 704 represents some of the points forming the outside shape of the two-dimensional image 703. For example, among points forming the outside shape, such as the point group 704, assume that a circle (hereinafter referred to as a circle of curvature) is drawn so that the circle includes five adjacent points. Circles 705 and 707 are exemplary circles of curvature. The gesture recognizing unit 409 sequentially draws circles of curvature for all of the points of the outside shape so that a circle of curvature includes five adjacent points. When the diameter of a circle of curvature is smaller than the threshold which is set (the curvature is small), the point is extracted as a fingertip. The diameters of the circles 705 and 707 are diameters 706 and 708, respectively. In the first embodiment, the gesture recognizing unit 409 generates a circle of curvature by using five adjacent points. However, the number of points which is used when a circle of curvature is generated may be less than five or more than five.

In the first embodiment, the gesture recognizing unit 409 detects a fingertip on the basis of a curvature of the outside shape of the two-dimensional image 703. Alternatively, the gesture recognizing unit 409 may detect a fingertip by performing ellipse fitting on the outside shape of the two-dimensional image 703.

In S634, the gesture recognizing unit 409 calculates the number of detected fingertips and the coordinates of each fingertip. As described above in S632, the gesture recognizing unit 409 stores the relationship between each point in the two-dimensional image 703 obtained through projection on the document board 204 and a correspondence point in the three-dimensional point group 701. Therefore, the gesture recognizing unit 409 may obtain three-dimensional coordinates for each fingertip.

In the first embodiment, the gesture recognizing unit 409 detects a fingertip from an image obtained through projection from the three-dimensional point group to a two-dimensional image. However, for example, the gesture recognizing unit 409 may extract a hand region from a background difference image of the range image, and may detect a fingertip on the basis of curvatures or the like of the outside shape of the extracted region. Alternatively, the gesture recognizing unit 409 may extract a hand region from the skin color region in the RGB image, and may detect a fingertip on the basis of curvatures or the like of the outside shape of the extracted region. In this case, since the coordinates of a detected fingertip are coordinates on the two-dimensional image, such as the RGB image or the range image, the gesture recognizing unit 409 needs to convert the detected coordinates into three-dimensional coordinates in the rectangular coordinate system by using the range information of the range image which corresponds to the detected coordinates. At that time, instead of using a point on the outside shape as a fingertip point, the gesture recognizing unit 409 may use the center of a circle of curvature which is used when a fingertip is detected, as a fingertip point.

In S604, the gesture recognizing unit 409 determines a gesture on the basis of the hand shape and the fingertips which are detected in S603. The process in S604 includes the processes of S641 to S646.

In S641, the gesture recognizing unit 409 determines whether or not one fingertip is detected in S603, on the basis of the number of fingertips which is calculated in S634. If the gesture recognizing unit 409 determines that one fingertip is detected, the process proceeds to S642. If the gesture recognizing unit 409 determines that one fingertip is not detected, the process proceeds to S646.

In S642, the gesture recognizing unit 409 calculates the distance between the fingertip detected in S633 and the plane including the document board 204 on the basis of the coordinates of the fingertip which are calculated in S634.

In S643, the gesture recognizing unit 409 determines whether or not the distance calculated in S642 is equal to or less than a threshold which is set. If the gesture recognizing unit 409 determines that the distance calculated in S642 is equal to or less than the threshold which is set, the process proceeds to S644. If the gesture recognizing unit 409 determines that the distance calculated in S642 is more than the threshold which is set, the process proceeds to S645.

In S644, the gesture recognizing unit 409 determines that a touch gesture in which the fingertip touches the document board 204 has been performed.

In S645, the gesture recognizing unit 409 determines that a fingertip-moving gesture in which the fingertip does not touch the document board 204 and in which the fingertip is located above the document board 204 has been performed.

In S646, the gesture recognizing unit 409 determines that no gestures have been performed.

In S605, the gesture recognizing unit 409 notifies the main controller 402 of the gesture determined in S604, returns the process back to S602, and repeatedly performs the gesture recognition process.

Process Performed by Calibration Controller

Figure 8A:
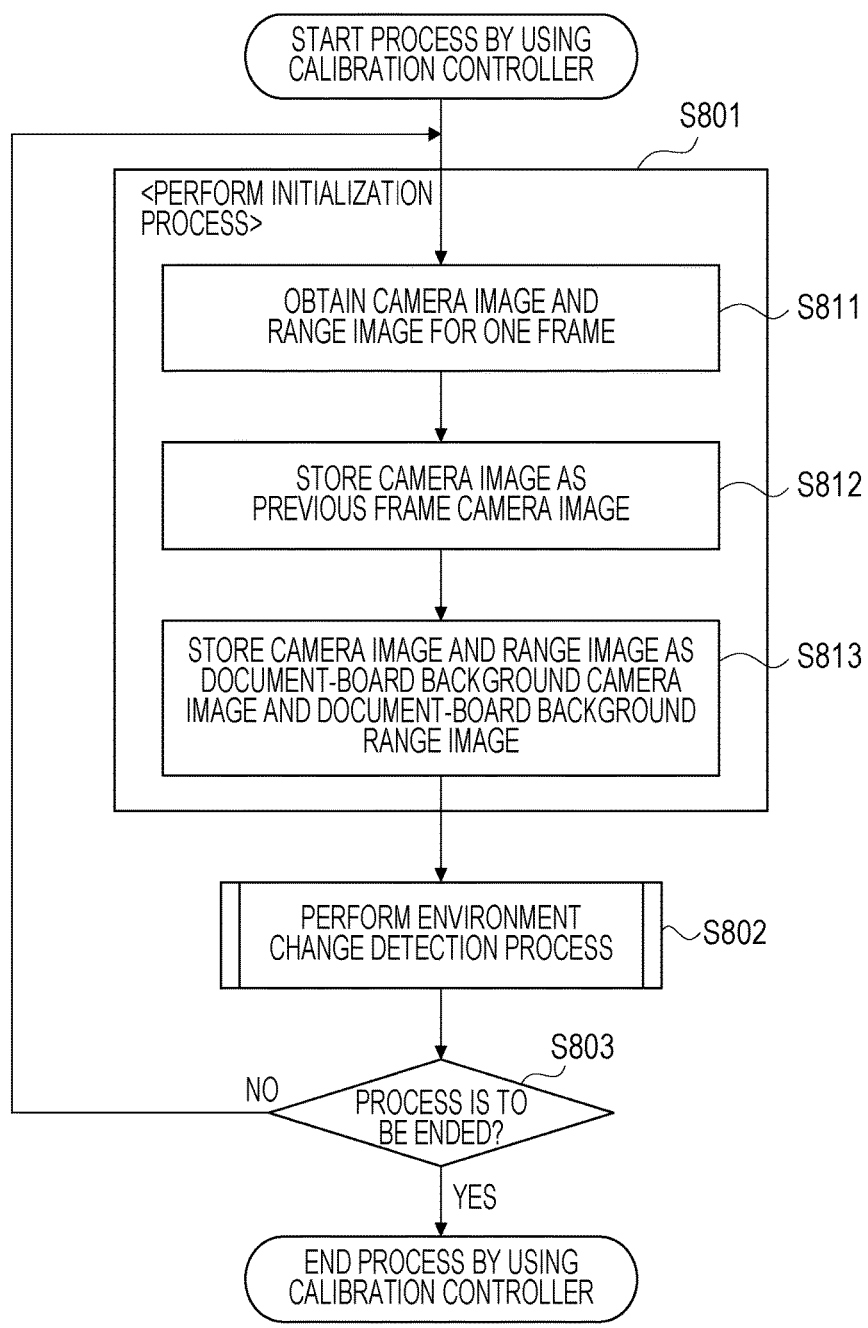
FIGS. 8A and 8B are flowcharts of an exemplary process performed by a calibration controller.
Figure 8B:
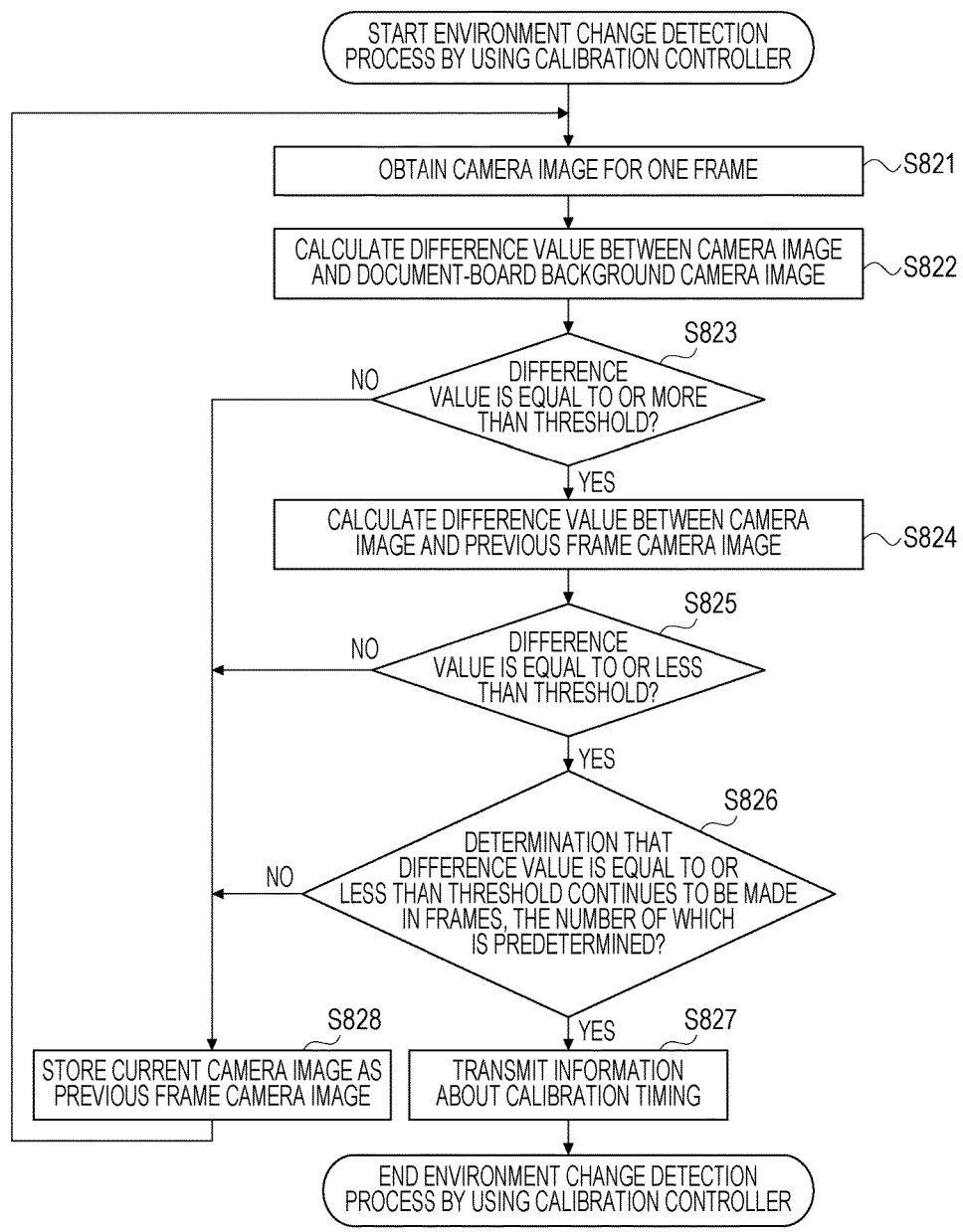

FIGS. 8A and 8B are flowcharts of an exemplary process performed by the calibration controller 412. In S801, the calibration controller 412 performs an initialization process. The process in S801 includes the processes of S811 to S813.

In S811, the calibration controller 412 obtains a camera image for one frame from the camera-image obtaining unit 407, and obtains a range image for one frame from the range-image obtaining unit 408.

In S812, the calibration controller 412 stores the camera image obtained in S811 as a previous frame camera image.

In S813, the calibration controller 412 stores the camera image and the range image which are obtained in S811, as a document-board background camera image and a document-board background range image, respectively, in the RAM 303, the HDD 305, the external memory 350, or the like. Hereinafter, the "document-board background camera image" and the "document-board background range image" denote the camera image and the range image which are obtained in S811.

In S802, the calibration controller 412 performs an environment change detection process of monitoring a change in adverse effect produced by incident light from the outside on the document board 204. The detail of the process in S802 will be described below by using FIG. 8B. The process in S802 is a process for monitoring a change produced by incident light from the outside or illumination on the document board 204, correcting a camera image obtained from the camera-image obtaining unit 407 in accordance with the condition, and generating electronic data in which the adverse effect produced by incident light from the outside or illumination is reduced.

In S803, the calibration controller 412 determines whether or not an instruction to end the process in FIGS. 8A and 8B has been received, on the basis of a user operation via the LCD touch panel 330 or the gesture recognizing unit 409. If the calibration controller 412 determines that an instruction to end the process in FIGS. 8A and 8B has been received, the process in FIGS. 8A and 8B is ended. If the calibration controller 412 determines that an instruction to end the process in FIGS. 8A and 8B has not been received, the process proceeds to S801.

FIG. 8B is a diagram illustrating the detail of the environment change detection process in S802.

In S821, the calibration controller 412 obtains a camera image for one frame from the camera-image obtaining unit 407.

In S822, the calibration controller 412 calculates the difference value between the camera image obtained in S821 and the document-board background camera image stored in S813. For example, the calibration controller 412 sums the differences between pixel values for the same coordinates in the images, and calculates the absolute value of the sum of the differences, as the difference value.

In S823, the calibration controller 412 determines whether or not the difference value calculated in S822 is equal to or more than a threshold which is set.

If the calibration controller 412 determines that the difference value calculated in S822 is equal to or more than the threshold which is set, the process proceeds to S824. If the calibration controller 412 determines that the difference value calculated in S822 is less than the threshold which is set, the calibration controller 412 determines that no change in environment of the document board 204 is present, and the process proceeds to S828.

When the process proceeds to S828, the current frame of the camera image is stored as the previous frame camera image, and the process then returns back to S821 and continues.

In S824, the calibration controller 412 calculates a difference value between the camera image obtained in S821 and the previous frame camera image. For example, as in S822, the calibration controller 412 sums the differences between the pixel values for the same coordinates in the images, and calculates the absolute value of the sum of the differences, as the difference value.

In S825, the calibration controller 412 determines whether or not the difference value calculated in S824 is equal to or less than a threshold which is set. If the calibration controller 412 determines that the difference value calculated in S824 is equal to or less than the threshold which is set, the process proceeds to S826. If the calibration controller 412 determines that the difference value calculated in S824 is more than the threshold which is set, the calibration controller 412 regards the change on the document board 204 as temporary noise, and the process proceeds to S828.

In S826, the calibration controller 412 determines whether or not the determination in S825 that the difference value is equal to or less than the threshold continues to occur multiple times, as many as a threshold which is set. That is, the calibration controller 412 determines whether or not the state of the document board 204 which has been changed continues in frames, the number of which is set. If the calibration controller 412 determines that the determination in S825 that the difference value is equal to or less than the threshold continues to occur in frames, the number of which is set, the calibration controller 412 determines that the environment is changed, and the process proceeds to S827. If the calibration controller 412 determines that the determination in S825 that the difference value is equal to or less than the threshold does not continue to occur in frames, the number of which is set, the calibration controller 412 regards the change on the document board 204 as temporary noise, and the process proceeds to S828.

Figure 9A:
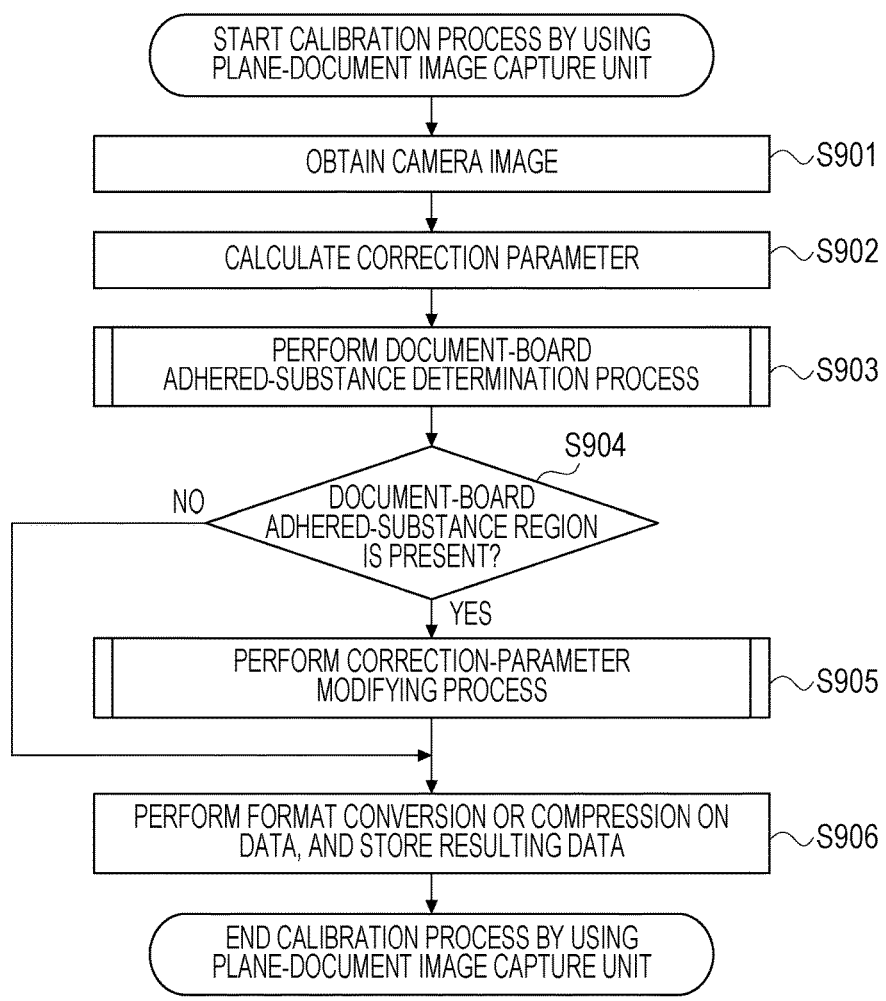
FIGS. 9A to 9E are flowcharts of exemplary processes performed by a plane-document photographing unit.

In S827, the calibration controller 412 notifies the main controller 402 of calibration timing, and ends the environment change detection process in FIG. 8B. When the notification is transmitted in S827, the calibration process in FIG. 9A is started.

In S828, the calibration controller 412 stores the camera image obtained in S821, as the previous frame camera image in the RAM 303, the HDD 305, the external memory 350, or the like. Then, the process returns back to S821, and continues.

Description of Plane-Document Image Capture Unit

Processes performed by the plane-document image capture unit 411 will be described by using the flowcharts in FIGS. 9A to 9D.

FIG. 9A is a diagram illustrating an exemplary calibration process performed when information about calibration timing is transmitted in S827 in FIG. 8B.

In S901, the plane-document image capture unit 411 obtains an image from the camera unit 202 via the camera-image obtaining unit 407, and uses the obtained image as a calibration image.

In S902, the plane-document image capture unit 411 calculates correction parameters for performing a correction process, from the calibration image obtained in S901. The calculated correction parameters are used in the correction process of performing correction calculation on each pixel in the image. Therefore, the plane-document image capture unit 411 calculates a value corresponding to each pixel in the image, as a correction parameter. The plane-document image capture unit 411 stores the calculated correction parameters in the HDD 305 or the RAM 303. The correction parameters calculated in S902 are, for example, correction parameters used in white balance correction.

In S903, the plane-document image capture unit 411 performs a document-board adhered-substance determination process of determining whether or not an adhered substance, such as dirt or dust, is present in the reading-out region 205 of the document board 204, by using the calibration image obtained in S901. The detail of the process in S903 will be described by using FIG. 9B.

In S904, the plane-document image capture unit 411 determines whether or not an adhered-substance region which is a region in which an adhered substance is present is present in the reading-out region 205, on the basis of the result from the process of S903. More specifically, the plane-document image capture unit 411 reads an adhered-substance flag which is set in S910 or S911 from the RAM 303. If the adhered-substance flag which has been read is set to 1, the plane-document image capture unit 411 determines that an adhered-substance region is present in the reading-out region 205. If the adhered-substance flag which has been read is set to 0, the plane-document image capture unit 411 determines that an adhered-substance region is not present in the reading-out region 205. If the plane-document image capture unit 411 determines that an adhered-substance region is not present in the reading-out region 205, the process proceeds to S906. If the plane-document image capture unit 411 determines that an adhered-substance region is present in the reading-out region 205, the process proceeds to S905.

In S905, the plane-document image capture unit 411 performs a correction-parameter modifying process. The detail of the process in S905 will be described below by using FIG. 9C.

In S906, the plane-document image capture unit 411 converts or compresses, into an adequate format, the correction parameters which are calculated in S902 or which are modified in S905 and the calibration image obtained in S901, and stores the resulting data in the HDD 305, the RAM 303, or the like. When the process in S906 is completed, the plane-document image capture unit 411 ends the process in FIG. 9A.

Figure 9B:
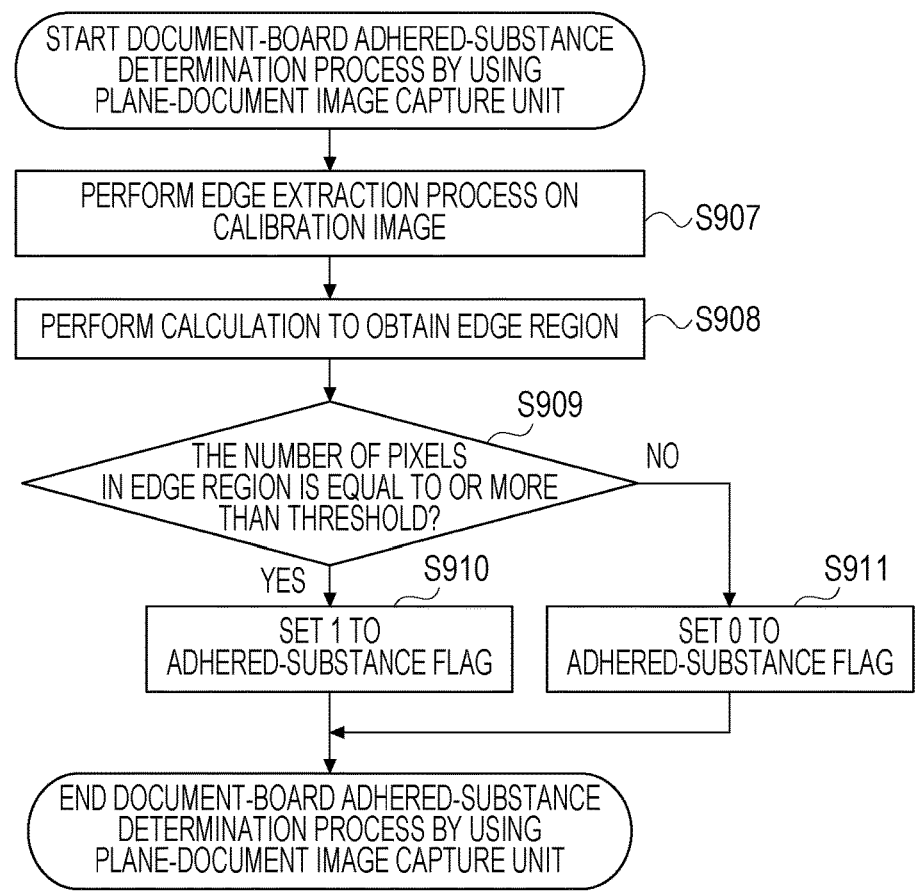

FIG. 9B is a flowchart for describing the detail of the document-board adhered-substance determination process in S903. The process in FIG. 9B will be described by using FIGS. 10A to 10C.

Figure 10A:
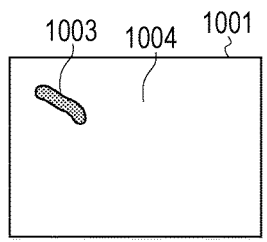
FIGS. 10A to 10I are diagrams illustrating exemplary information handled by the calibration controller.

FIG. 10A is a diagram illustrating a calibration image 1001 in which an adhered substance 1003 and an adverse effect 1004 which is produced by incident light from the outside, illumination, or the like are present. The plane-document image capture unit 411 has obtained the calibration image 1001 in S901.

In S907, the plane-document image capture unit 411 performs edge extraction on the calibration image 1001 obtained in S901. The process in S907 is a process for differentiating only the adhered substance 1003 among the adhered substance 1003, the adverse effect 1004 produced by incident light from the outside or illumination, and the like, which are present in a mixed manner in the calibration image 1001.

The reason why the adhered substance 1003 is capable of being differentiated through the edge extraction is as follows. An image is mildly changed due to the adverse effect 1004 produced by incident light from the outside or illumination. In contrast, an image is sharply changed due to an adverse effect produced by the adhered substance 1003. The edge extraction in S907 is typical filter processing, and may be a process using a sobel filter, or a process using a Laplacian filter or the like. The filter used in the edge extraction in S907 is an exemplary edge extraction filter.

Figure 10B:
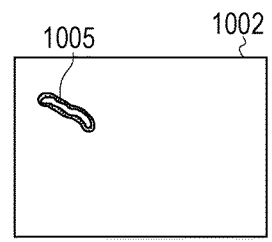

The plane-document image capture unit 411 completes the edge extraction in S907, thereby generating an edge-extracted image 1002 obtained by extracting only an edge from the calibration image, as illustrated in FIG. 10B. The edge-extracted image 1002 includes an edge portion 1005 of the adhered substance.

In S908, the plane-document image capture unit 411 performs calculation to obtain an adhered-substance region which is a region in which the adhered substance is present, on the basis of the edge extracted in S907. The process in S908 is a process of calculating the original position of the adhered substance 1003 on the basis of the edge portion 1005 of the dust.

Figure 10C:
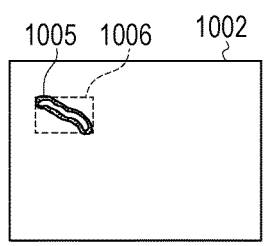

In the first embodiment, as illustrated in FIG. 10C, the process in S908 is a process of performing calculation to obtain an edge region 1006 surrounding the edge portion 1005, as an adhered-substance region in order to reduce the processing load. Alternatively, the process in S908 may be a process of performing calculation to obtain the inside of the closed region of the edge portion 1005, as an adhered-substance region.

In S909, the plane-document image capture unit 411 determines whether or not the number of pixels in the edge region obtained through calculation in S908 is equal to or more than a threshold which is set. If the plane-document image capture unit 411 determines that the number of pixels in the edge region obtained through calculation in S908 is equal to or more than the threshold which is set, the plane-document image capture unit 411 determines that an adhered substance whose size is equal to or more than a size which is set is present, and the process proceeds to S910. If the plane-document image capture unit 411 determines that the number of pixels in the edge region calculated in S908 is less than the threshold which is set, the process proceeds to S911.

In S910, the plane-document image capture unit 411 sets 1 to the adhered-substance flag, and stores the adhered-substance flag in the RAM 303.

In S911, the plane-document image capture unit 411 sets 0 to the adhered-substance flag, and stores the adhered-substance flag in the RAM 303.

Figure 9C:
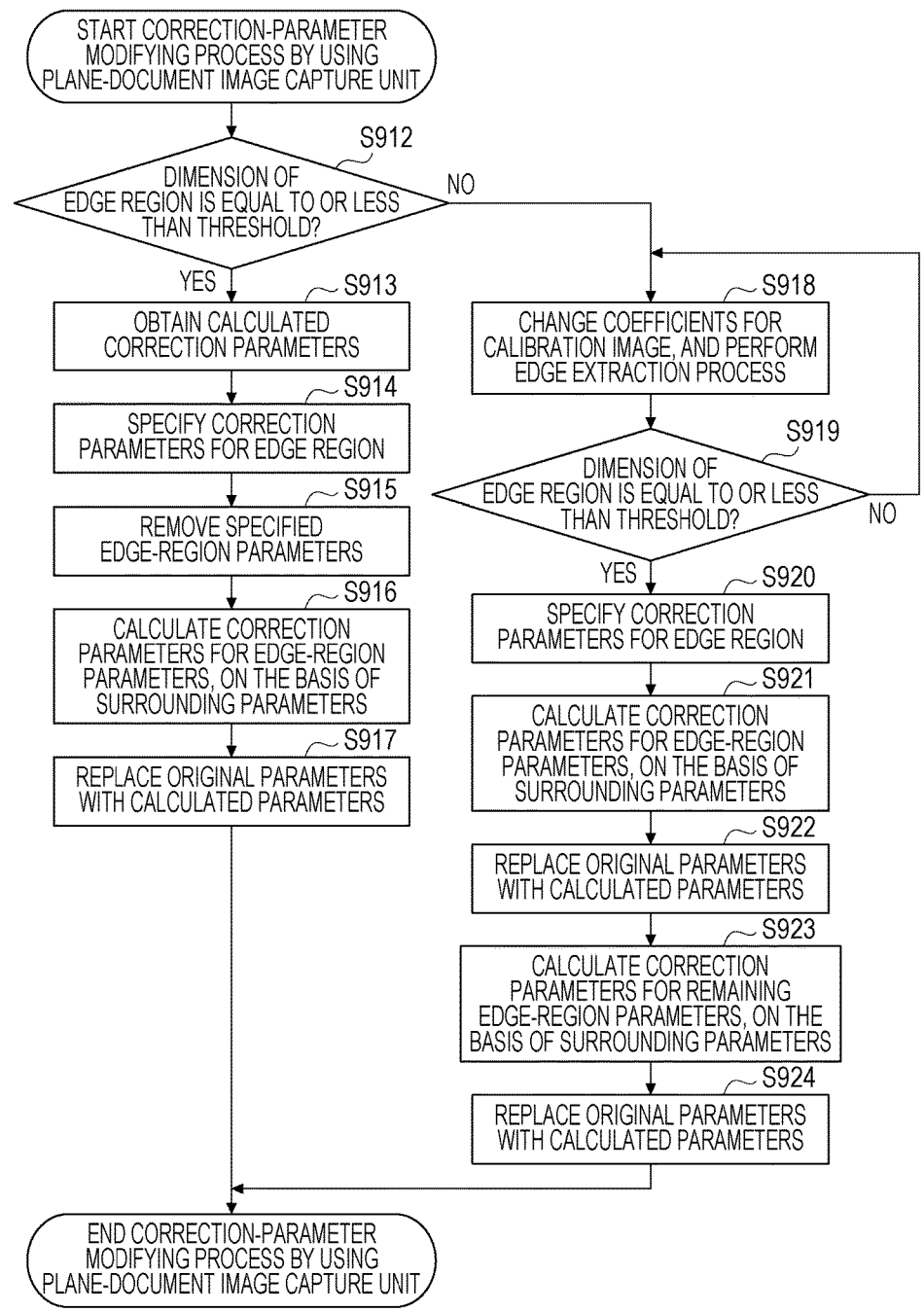

FIG. 9C is a flowchart illustrating the detail of the correction-parameter modifying process in S905. The process in FIG. 9C will be described by using FIGS. 10D to 10I.

In S912, the plane-document image capture unit 411 determines whether or not a dimension of the edge region 1006 is equal to or less than a threshold which is set. In the first embodiment, the dimension of the edge region 1006 is a larger value selected from the length of the edge region 1006 in the longitudinal direction and that in the lateral direction. If the plane-document image capture unit 411 determines that the dimension of the edge region 1006 is equal to or less than the threshold which is set, the process proceeds to S913. If the plane-document image capture unit 411 determines that the dimension of the edge region 1006 is more than the threshold which is set, the process proceeds to S918.

In S913, the plane-document image capture unit 411 obtains the correction parameters calculated in S902, from the HDD 305 or the RAM 303.

In S914, the plane-document image capture unit 411 specifies correction parameters for the positions corresponding to the pixels in the edge region, from the correction parameters obtained in S913.

Figure 10D:
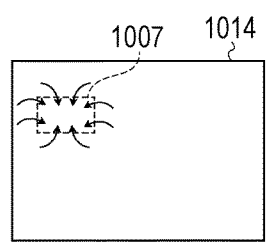

The correction parameters each are calculated for a corresponding one of the pixels. Therefore, the plane-document image capture unit 411 disposes the values of the correction parameters determined for the respective pixels, in such a manner that the position of each of the correction parameters corresponds to the position of a corresponding one of the pixels in the edge-extracted image 1002. FIG. 10D is a diagram illustrating a correction parameter image 1014 in which the values of correction parameters determined for the respective pixels are disposed in such a manner that the position of each of the correction parameters corresponds to the position of a corresponding one of the pixels in the edge-extracted image 1002. The plane-document image capture unit 411 obtains edge-region parameters 1007 in a region corresponding to the edge region 1006, in the correction parameter image 1014, thereby specifying correction parameters for the positions corresponding to the pixels in the edge region, from the correction parameters obtained in S913.

In S914, the edge-region parameters 1007 corresponding to the edge region 1006 are specified. However, the edge-region parameters 1007 which are inadequate parameters due to the adverse effect produced by the adhered substance 1003 need to be modified.

In S915, the plane-document image capture unit 411 removes the edge-region parameters 1007 from the correction parameter image 1014.

In S916, the plane-document image capture unit 411 calculates correction parameters in the region corresponding to the edge-region parameters 1007, on the basis of the correction parameters in a region surrounding the region corresponding to the edge-region parameters 1007 on the correction parameter image 1014. The process of calculating correction parameters in S916 is, for example, a process of performing calculation by performing weighting interpolation from parameter values in a surrounding region as illustrated in FIG. 10D.

In S917, the plane-document image capture unit 411 replaces the edge-region parameters 1007 with the correction parameters calculated in S916. The modification of the correction parameter image 1014 is completed. Therefore, the plane-document image capture unit 411 stores the correction parameters corresponding to the correction parameter image 1014, in the HDD 305 or the RAM 303 again.

When the process in S917 is completed, the plane-document image capture unit 411 ends the process in FIG. 9C.

Figure 10E:
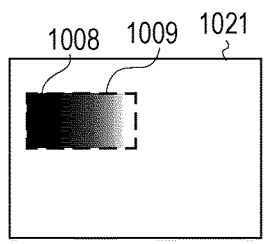
Figure 10F:
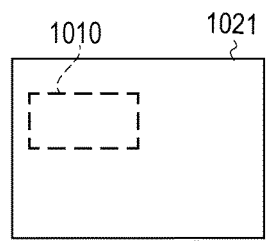

As in FIG. 10E, when an adhered substance 1008 in a calibration image 1021 is large, a dimension of an edge region 1009 is larger than the threshold which is set. In this case, as illustrated in FIG. 10F, the region for edge-region parameters 1010 which are to be modified also has a large dimension. If the calibration image 1021 is obtained in S901, the plane-document image capture unit 411 causes the process to proceed to S918 on the basis of the result of the process of S912.

Figure 10G:
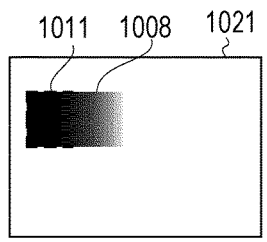
Figure 10H:
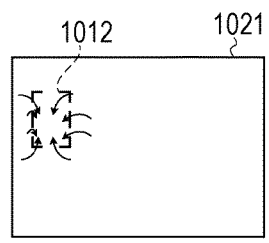

In S918, the plane-document image capture unit 411 changes coefficients of the filter used in the edge extraction, and performs the edge extraction again on the calibration image 1021. The plane-document image capture unit 411 changes the coefficients of the filter so that a dirtier portion is extracted from the edge region 1009. Through the process in S918, the plane-document image capture unit 411 extracts a second edge region 1011 as illustrated in FIG. 10G.

In S919, the plane-document image capture unit 411 determines whether or not a dimension of the second edge region extracted in S918 is equal to or less than the threshold which is set. The processes in S918 and S919 are repeatedly performed until the dimension of the second edge region is equal to or less than the threshold. The plane-document image capture unit 411 may change the threshold in the middle of the repetition on the basis of a user operation or the like through the LCD touch panel 330.

In S920, the plane-document image capture unit 411 specifies correction parameters corresponding to the second edge region 1011. The process of specifying correction parameters corresponding to the second edge region 1011, which is performed in S920, is similar to the process in S914. From the result of the specification of correction parameters corresponding to the second edge region 1011, the plane-document image capture unit 411 specifies edge-region parameters 1012 illustrated in FIG. 10H.

In S921, the plane-document image capture unit 411 calculates the values of the edge-region parameters 1012 from parameters in a surrounding region. The calculation method is similar to that in the process in S916.

In S922, the plane-document image capture unit 411 replaces the edge-region parameters 1012 with the parameters calculated in S921.

Figure 10I:
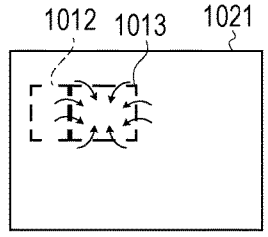

In S923, the plane-document image capture unit 411 calculates edge-region parameters 1013 on the basis of the correction parameters calculated in S902 and the edge-region parameters 1012 calculated in S921. As illustrated in FIG. 10I, the edge-region parameters 1013 are specified by removing the edge-region parameters 1012 from the edge-region parameters 1010.

In S924, the plane-document image capture unit 411 replaces the edge-region parameters 1013 with the correction parameters calculated in S923. Through the processes in S922 and S924, modification of the edge-region parameters 1010 is completed, and the plane-document image capture unit 411 ends the process in FIG. 9C.

Figure 9D:
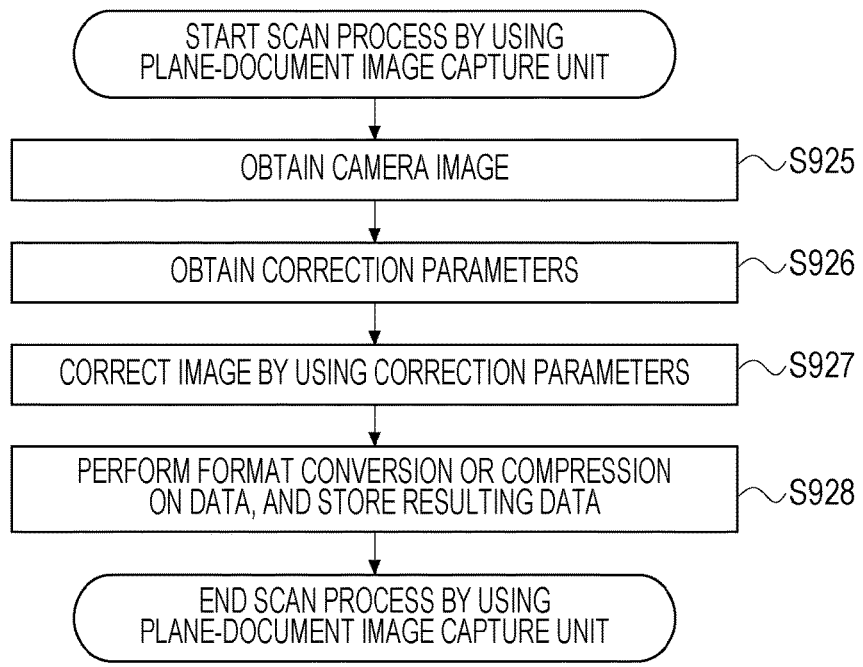

FIG. 9D is a flowchart of a scan process performed by the plane-document image capture unit 411. In S1503 described below by using FIG. 11, when the main controller 402 transmits an instruction to perform a scan process, the plane-document image capture unit 411 starts the process in FIG. 9D.

In S925, the plane-document image capture unit 411 obtains a camera image.

In S926, the plane-document image capture unit 411 obtains the correction parameters calculated in the calibration process in FIG. 9A.

In S927, the plane-document image capture unit 411 uses the correction parameters obtained in S926 to perform image correction processing on the camera image obtained in S925.

In S928, the plane-document image capture unit 411 converts or compresses, into an adequate format, the electronic data subjected to the correction process in S927, and stores the resulting data in the HDD 305 or the RAM 303.

Description of Main Controller

Figure 11:
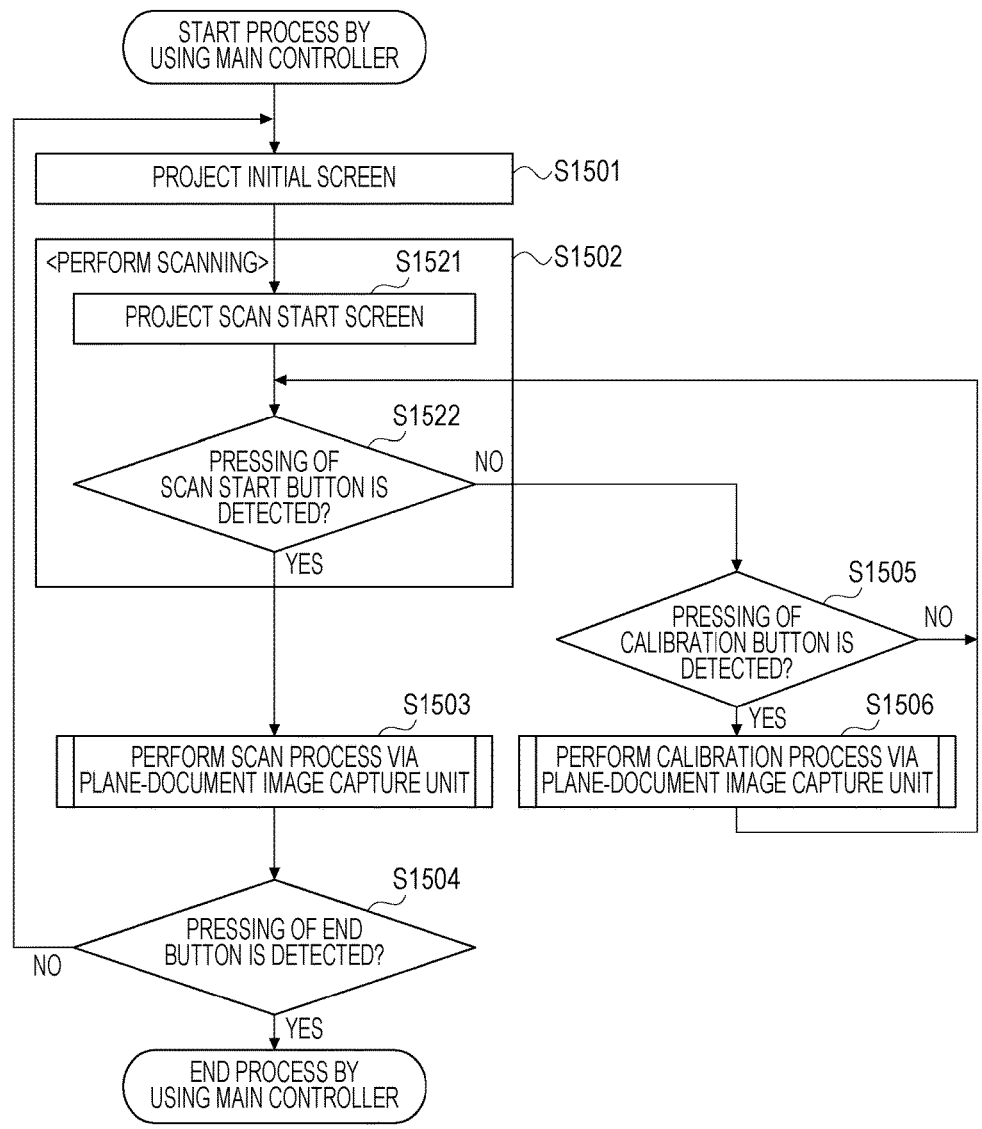
FIG. 11 is a flowchart of an exemplary process performed by a main controller.

FIG. 11 is a flowchart of an exemplary process performed by the main controller 402.

Figure 12A:
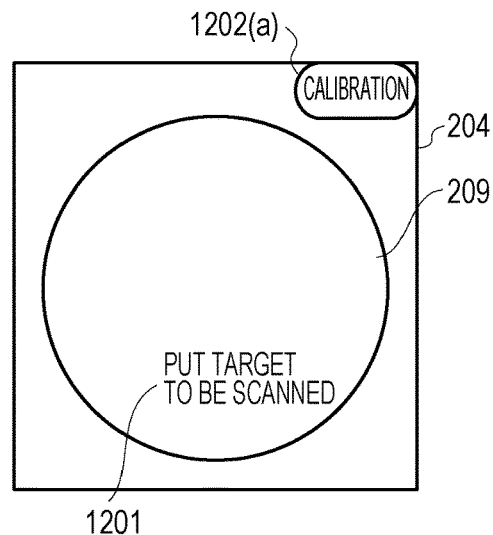
FIGS. 12A to 12C are diagrams illustrating exemplary screens projected by a user interface unit.

In S1501, the main controller 402 projects an initial screen on the document board 204 via the user interface unit 403 and the projector 207. FIG. 12A is a diagram illustrating an exemplary initial screen. The screen in FIG. 12A includes a region 209 for putting a scan target, a calibration button 1202(a) which is a button for receiving an instruction to perform a calibration process, and a message 1201. Thus, the main controller 402 is capable of determining whether a user wants to perform scanning or calibration, and is capable of scanning a document and performing calibration.

The main controller 402 waits until the main controller 402 detects pressing of a scan start button 1203 or the calibration button 1202(a) on the basis of a user operation.

In S1502, the main controller 402 performs scanning. The process in S1502 includes the processes of S1521 to S1522.

Figure 12B:
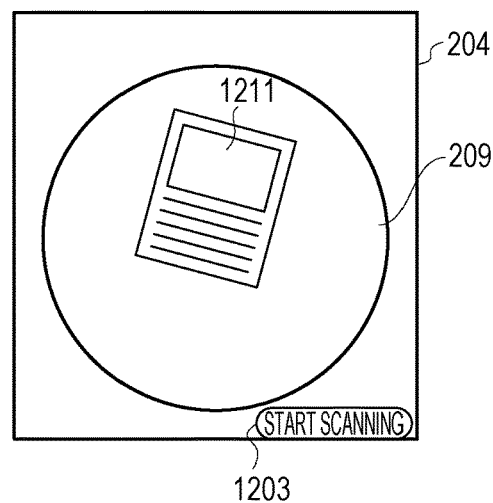

In S1521, the main controller 402 projects a scan start screen on the document board 204 via the user interface unit 403. FIG. 12B illustrates an exemplary scan start screen. A target 1211 on the scan start screen illustrated in FIG. 12B is a scan target which is put by the user. The scan start button 1203 is a button used to receive an instruction to photograph the document.

The main controller 402 performs the following process via the user interface unit 403 on the basis of the coordinates at which a touch gesture is performed and which is notified from the gesture recognizing unit 409 and on the basis of the coordinates at which a button such as the scan start button 1203 is displayed. That is, the main controller 402 detects pressing of a button which is performed by the user. For a button other than the scan start button 1203, the main controller 402 also detects pressing performed by the user, through a similar process.

In S1522, the main controller 402 determines whether or not pressing of the scan start button 1203 is detected. If the main controller 402 determines that pressing of the scan start button 1203 is detected, the process proceeds to S1503. If the main controller 402 determines that pressing of the scan start button 1203 is not detected, the process proceeds to S1505.

In S1503, the main controller 402 performs a scan process via the plane-document image capture unit 411. The detail of the scan process in S1503 is similar to that in FIG. 9D.

In S1504, the main controller 402 displays a scan end screen on the document board 204, and determines whether or not pressing of an end button 1204 is detected, via the displayed scan end screen. If the main controller 402 determines that pressing of the end button 1204 is detected, the main controller 402 ends the process in FIG. 11. If the main controller 402 determines that pressing of the end button 1204 is not detected, the process proceeds to S1501.

Figure 12C:
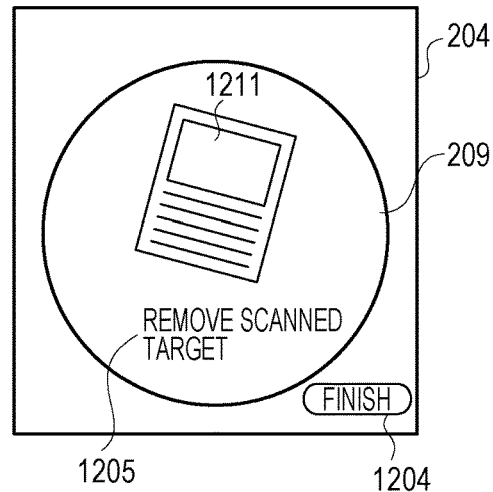

FIG. 12C is a diagram illustrating an exemplary scan end screen. The scan end screen in FIG. 12C includes a message 1205 for notifying the user that the scanned document is to be removed, and the end button 1204 for receiving an instruction to end the process performed by the main controller 402.

In S1505, the main controller 402 determines whether or not pressing of the calibration button 1202(a) is detected. If the main controller 402 determines that pressing of the calibration button 1202(a) is detected, the process proceeds to S1506. If the main controller 402 determines that pressing of the calibration button 1202(a) is not detected, the process proceeds to S1522.

In S1506, the main controller 402 starts the calibration process via the plane-document image capture unit 411. The detail of the calibration process in S1506 is similar to that in FIG. 9A. When the process in S1506 is ended, the main controller 402 returns the process back to S1522.

Through the processes according to the first embodiment, the camera scanner 101 captures a calibration image to perform calibration, and calculates correction values on the basis of the captured image. When the camera scanner 101 is to generate a corrected image, the camera scanner 101 extracts an edge in the calibration image, and performs calculation to obtain a region for the extracted edge. The camera scanner 101 determines whether or not an adhered substance, such as dust or dirt, is present, on the basis of the edge region obtained through calculation. Thus, the camera scanner 101 is capable of specifying an adhered substance regardless of the color of the adhered substance.

When an adhered substance is present in the calibration image, the camera scanner 101 calculates the correction values again. Thus, the camera scanner 101 is always capable of obtaining correct correction values.

Second Embodiment

In the first embodiment, the method of obtaining a corrected image, the process of generating correction parameters from a calibration image, and the like are mainly described.

In a second embodiment, a process performed when an adhered substance, such as dust or dirt, whose size is equal to or larger than a threshold which is set is present in the calibration image obtained in S901 will be described.

In the second embodiment, the difference between the first embodiment and the second embodiment will be described. The other processes, the system configuration of the camera scanner system, the hardware configuration and the functional configuration of the components of the camera scanner system, and the like are similar to those in the first embodiment.

The calibration process performed by the plane-document image capture unit 411 in the second embodiment will be described by using FIGS. 9E, 13A, and 13B. The difference between FIG. 9E and FIG. 9A will be described.

In S904, the plane-document image capture unit 411 determines whether or not an adhered-substance region is present in the reading-out region 205, on the basis of the result of the process in S903. If the plane-document image capture unit 411 determines that an adhered-substance region is not present in the reading-out region 205, the process proceeds to S906. If the plane-document image capture unit 411 determines that an adhered-substance region is present in the reading-out region 205, the process proceeds to S931.

In S931, the plane-document image capture unit 411 displays the adhered-substance region on the document board 204 in such a manner that the adhered-substance region is superimposed on an operation screen, such as the initial screen or the scan start screen, thereby notifying a user of the adhered-substance region. The process in S931 enables the user to recognize the adhered-substance region and remove the adhered substance.

Figure 13A:
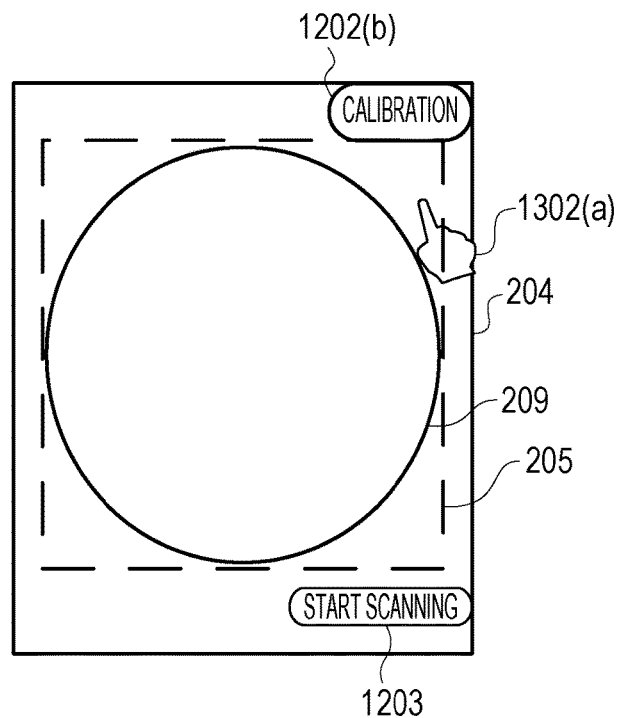
FIGS. 13A and 13B are diagrams illustrating exemplary screens projected by the user interface unit.

For example, as illustrated in FIG. 13A, when the plane-document image capture unit 411 detects pressing of a calibration button 1202(b) on the basis of an operation performed on the operation screen by using a user's hand 1302(a), the plane-document image capture unit 411 performs the following process. That is, the plane-document image capture unit 411 starts the calibration process in FIG. 9E, and determines whether or not an adhered-substance region is present in S904. If the plane-document image capture unit 411 determines that an adhered-substance region is present, the plane-document image capture unit 411 displays the position of the adhered-substance region on the document board 204 in S931, thereby notifying the user of the position.

Figure 13B:
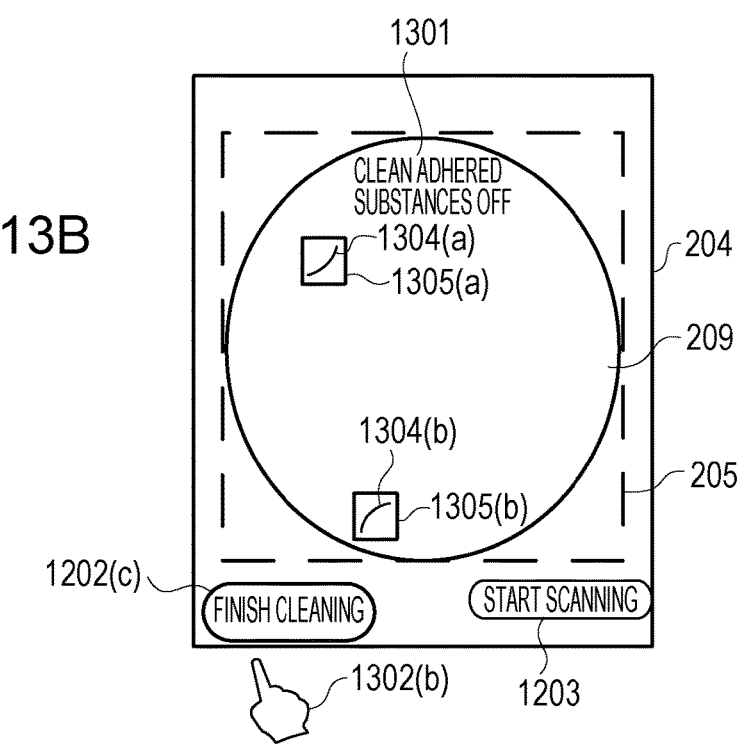

For example, as illustrated in FIG. 13B, when adhered substances 1304(a) and 1304(b) are present on the document board 204, the plane-document image capture unit 411 specifies adhered-substance regions 1305(a) and 1305(b). The plane-document image capture unit 411 displays the adhered-substance regions 1305(a) and 1305(b), thereby notifying the user of the regions and displaying a message 1301 to urge the user to perform cleaning.

When the user finishes cleaning or determines that cleaning is not necessary, the user presses a cleaning end button 1202(c) with a user's hand 1302(b). The plane-document image capture unit 411 detects pressing of the cleaning end button 1202(c) with the user's hand 1302(b).

When the process in S931 is ended, the plane-document image capture unit 411 causes the process to proceed to S905. The processes after that are similar to those in the first embodiment.

Through the processes in the second embodiment, the plane-document image capture unit 411 captures a calibration image, and determines whether or not dirt or dust is present in the calibration image. If an adhered substance is present in the calibration image, the plane-document image capture unit 411 notifies a user of the region in which the adhered substance is present, via the user interface unit 403, and urges the user to perform cleaning, thereby reducing probability of failing to obtain an adequate correction image.

Third Embodiment

In the second embodiment, the process of notifying a user of an extracted adhered-substance region and urging the user to clean the region is described.

In a third embodiment, a process of setting a region obtained by removing an extracted adhered-substance region, as the region 209 for putting a scan target will be described.

In the third embodiment, the difference between the first or second embodiment and the third embodiment will be described. The other processes, the system configuration of the camera scanner system, the hardware configuration and the functional configuration of the components of the camera scanner system, and the like are the same as those in the first embodiment.

Figure 9E:
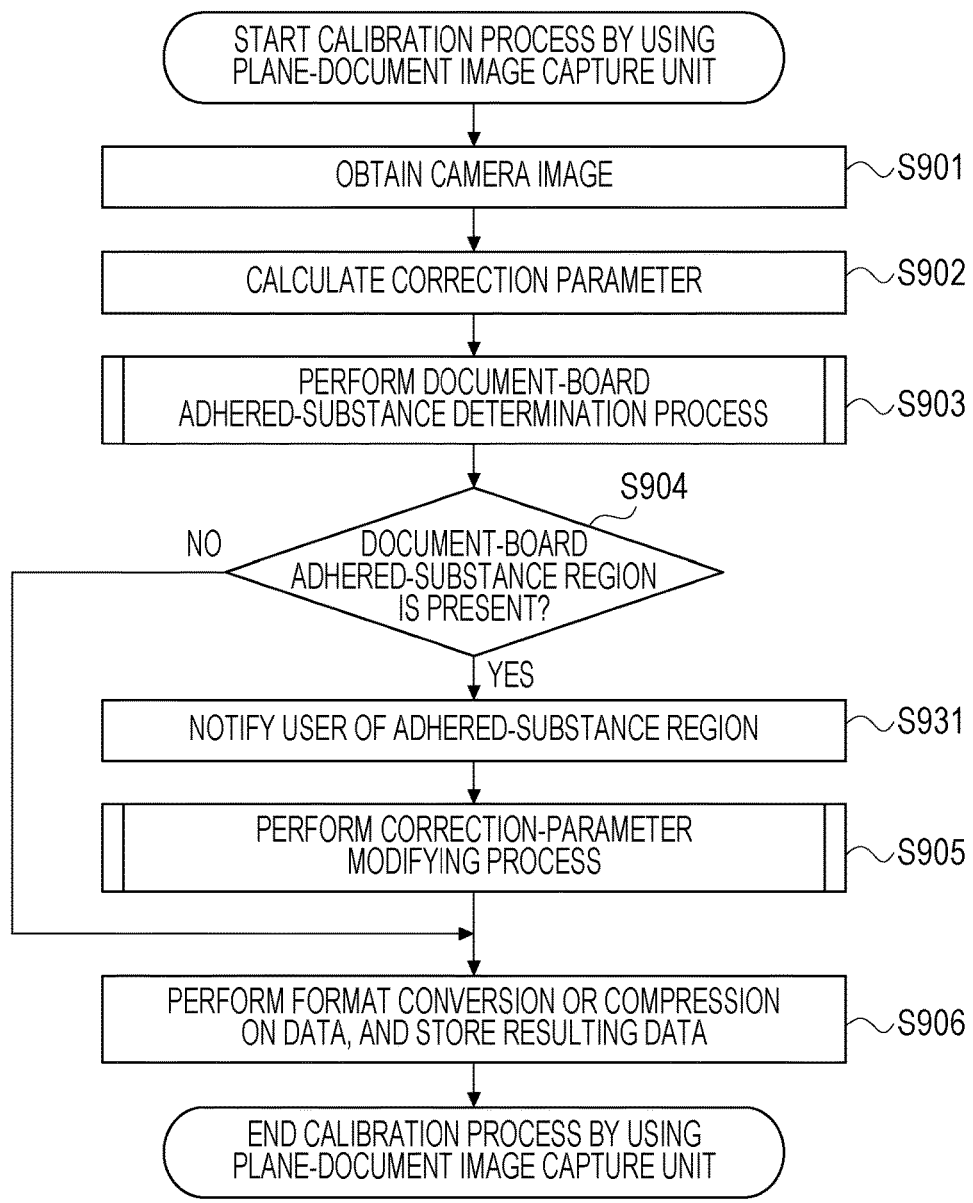

The calibration process according to the third embodiment is different from that according to the second embodiment in the processes of S931 and S905 in FIG. 9E.

In S931, the plane-document image capture unit 411 uses the edge region obtained through calculation in S908 as an adhered-substance region, and sets a region obtained by removing the adhered-substance region on the plane including the document board 204, as the region 209 for putting a scan target. The plane-document image capture unit 411 specifies a region whose size is equal to or larger than a threshold that is set, and which is set from a region obtained by removing the adhered-substance region on the plane including the document board 204, and sets the specified region as the region 209 for putting a scan target. The region 209 is an exemplary photographable region.

The plane-document image capture unit 411 displays the region 209 which is set, in such a manner that the region 209 is superimposed on an operation screen, thereby notifying the user of the region 209. This process enables the user to grasp where a scan target is to put.

The plane-document image capture unit 411 uses the region which is obtained by removing the adhered-substance region and which is set in S931, in the scan process. Therefore, the process of modifying the correction parameters, which is performed in S905, does not need to be performed.

The processes after that are similar to those in the first or second embodiment.

The processes according to the third embodiment enable the camera scanner 101 to notify a user of a region for scanning in which no adverse effect produced by an adhered substance is present. The camera scanner 101 scans a target which is put in the region for scanning in which no adverse effect produced by an adhered substance is present, achieving adequate image correction without modifying correction parameters.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-002510 filed Jan. 8, 2015, which is hereby incorporated by reference herein in its entirety.

What is claimed is:

1. An image processing apparatus comprising:
   an image capturing unit configured to capture an image of a document placed on a document board;

a processor; and a memory storing instructions, when executed by the processor, causing the apparatus to function as:

a determination unit configured to determine a correction parameter for correcting a first image of the document placed on the document board, the first image being captured by the image capturing unit, using a value corresponding to each pixel in a second image that is captured by imaging the document board by the image capturing unit; and a correction unit configured to correct the first image of the document placed on the document board, the first image being captured by the image capturing unit, using the correction parameter determined by the determination unit, wherein the determination unit modifies the parameter by modifying a value corresponding to each pixel in a first region containing an edge portion extracted based on an edge extraction filter from the second image of the document board using a value corresponding to each pixel surrounding the first region, wherein in a case where the first region surrounding the edge portion is larger than a predetermined size, the determination unit is configured to change a coefficient of the edge extraction filter, extract the edge portion from the second image of the document board, and determine, as a second region, a region surrounding an edge portion extracted using the changed coefficient.

2. The image processing apparatus according to claim 1, wherein the determination unit is configured to determine a parameter corresponding to the second region, using a correction parameter corresponding to a region around the second region, and determine a parameter corresponding to the first region from which the second region is excluded, using the correction parameter corresponding to the region around the first region.

3. The image processing apparatus according to claim 1, further comprising:

a display unit configured to display the first region.

4. A control method for controlling an image processing apparatus including an image capturing unit configured to capture an image of a document placed on a document board, the control method comprising:

determining a correction parameter for correcting a first image of the document placed on the document board, the first image being captured by the image capturing unit, using a value corresponding to each pixel in a second image that is captured by imaging the document board; and correcting the first image of the document placed on the document board, the first image being captured by the image capturing unit, using the correction parameter determined in the determining, wherein the determining modifies the parameter by modifying a value corresponding to each pixel in a first region containing an edge portion extracted based on an edge extraction filter from the second image of the document board using a value corresponding to each pixel surrounding the first region, wherein in a case where the first region surrounding the edge portion is larger than a predetermined size, the determining changes a coefficient of the edge extraction filter, extracts the edge portion from the second image of the document board, and determines, as a second region, a region surrounding an edge portion extracted using the changed coefficient.

5. A non-transitory computer-readable storage medium storing a control method for controlling an image processing apparatus including an image capturing unit configured to capture an image of a document placed on a document board, the control method comprising:

determining a correction parameter for correcting a first image of the document placed on the document board, the first image being captured by the image capturing unit, using a value corresponding to each pixel in a second image that is captured by imaging the document board; and correcting the first image of the document placed on the document board, the first image being captured by the image capturing unit, using the correction parameter determined in the determining, wherein the determining modifies the parameter by modifying a value corresponding to each pixel in a first region containing an edge portion extracted based on an edge extraction filter from the second image of the document board using a value corresponding to each pixel surrounding the first region, wherein in a case where the first region surrounding the edge portion is larger than a predetermined size, the determining changes a coefficient of the edge extraction filter, extracts the edge portion from the second image of the document board, and determines, as a second region, a region surrounding an edge portion extracted using the changed coefficient.

* * * * *